(12) United States Patent
Lindholm et al.

(10) Patent No.: US 6,844,880 B1
(45) Date of Patent: Jan. 18, 2005

(54) SYSTEM, METHOD AND COMPUTER PROGRAM PRODUCT FOR AN IMPROVED PROGRAMMABLE VERTEX PROCESSING MODEL WITH INSTRUCTION SET

(75) Inventors: John Erik Lindholm, Cupertino, CA (US); David C. Tannenbaum, Austin, TX (US); Robert Steven Glanville, Cupertino, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 09/960,630

(22) Filed: Sep. 20, 2001

Related U.S. Application Data

(63) Continuation-in-part of application No. 09/456,102, filed on Dec. 6, 1999, and a continuation-in-part of application No. 09/586,249, filed on May 31, 2000.

(51) Int. Cl.[7] .................................................. G06T 1/20
(52) U.S. Cl. ...................... 345/506; 345/419; 345/522; 708/270; 708/290
(58) Field of Search ................................ 345/501–570, 345/419, 426, 427, 649; 708/270, 276, 277, 290

(56) References Cited

U.S. PATENT DOCUMENTS

| | | | | |
|---|---|---|---|---|
| 4,905,177 A | * | 2/1990 | Weaver et al. | 708/276 |
| 4,996,666 A | | 2/1991 | Duluk, Jr. | 365/49 |
| 5,025,407 A | | 6/1991 | Gulley et al. | 364/754 |
| 5,222,202 A | | 6/1993 | Koyamada | 395/123 |
| 5,459,820 A | | 10/1995 | Schroeder et al. | 395/120 |
| 5,517,611 A | * | 5/1996 | Deering | 345/503 |
| 5,535,288 A | | 7/1996 | Chen et al. | 382/236 |
| 5,572,634 A | | 11/1996 | Duluk, Jr. | 395/119 |
| 5,574,835 A | | 11/1996 | Duluk, Jr. et al. | 395/121 |
| 5,596,686 A | | 1/1997 | Duluk, Jr. et al. | 395/122 |
| 5,669,010 A | | 9/1997 | Duluk, Jr. | 395/800.22 |
| 5,689,695 A | * | 11/1997 | Read | 712/234 |
| 5,694,143 A | | 12/1997 | Fielder et al. | 345/112 |
| 5,724,561 A | | 3/1998 | Tarolli et al. | 395/523 |

(List continued on next page.)

FOREIGN PATENT DOCUMENTS

| | | | | |
|---|---|---|---|---|
| EP | 0690430 A2 | 1/1996 | | G09G/1/16 |
| EP | 0690430 A3 | 7/1996 | | G09G/1/16 |
| WO | 93/23816 | 11/1993 | | G06F/15/334 |

(List continued on next page.)

OTHER PUBLICATIONS

Marc Olano and Trey Greer; "Triangle Scan Conversion Using 2D Homogeneous Coordinates"; 1997, Siggraph/Eurographics Workshop.

Primary Examiner—Ulka J. Chauhan
(74) Attorney, Agent, or Firm—Zilka-Kotab, PC

(57) ABSTRACT

A system, method and computer program product are provided for branching during programmable processing in a computer graphics pipeline. Initially, data is received. Programmable operations are then performed on the data in order to generate output. Such operations are programmable by a user utilizing instructions from a predetermined instruction set. When performing the programmable operations in the foregoing manner, programmable branching may take place between the programmable operations. Subsequently, the output is stored in memory. Also included is a system, method and computer program product for directly executing a function in the computer graphics pipeline. Initially, input data is received in the computer graphics pipeline. A mathematical function is directly performed on the input data in order to generate output data. It should be noted that the mathematical function is directly performed in the computer graphics pipeline without a texture look-up or aid from a central processing unit. Next, the output data is stored in memory on the computer graphics pipeline.

51 Claims, 8 Drawing Sheets

U.S. PATENT DOCUMENTS

| | | | |
|---|---|---|---|
| 5,764,228 A * | 6/1998 | Baldwin | 345/797 |
| 5,801,711 A | 9/1998 | Koss et al. | 345/441 |
| 5,838,337 A | 11/1998 | Kimura et al. | 345/519 |
| 5,886,701 A | 3/1999 | Chauvin et al. | 345/418 |
| 5,956,042 A | 9/1999 | Tucker et al. | 345/426 |
| 5,977,987 A | 11/1999 | Duluk, Jr. | 345/441 |
| 5,977,997 A | 11/1999 | Vainsencher | 345/519 |
| 6,000,027 A | 12/1999 | Pawate et al. | 712/39 |
| 6,014,144 A | 1/2000 | Nelson et al. | 345/426 |
| 6,057,855 A | 5/2000 | Barkans | 345/435 |
| 6,097,395 A | 8/2000 | Harris et al. | 345/426 |
| 6,128,638 A * | 10/2000 | Thomas | 708/606 |
| 6,137,497 A | 10/2000 | Strunk et al. | 345/434 |
| 6,144,365 A | 11/2000 | Young et al. | 345/153 |
| 6,163,319 A | 12/2000 | Peercy et al. | 345/426 |
| 6,163,837 A * | 12/2000 | Chan et al. | 712/216 |
| 6,229,553 B1 | 5/2001 | Duluk, Jr. et al. | 345/506 |
| 6,242,343 B1 | 6/2001 | Yamazaki et al. | 438/633 |
| 6,268,875 B1 | 7/2001 | Duluk, Jr. et al. | 345/506 |
| 6,285,378 B1 | 9/2001 | Duluk, Jr. | 345/441 |
| 6,288,723 B1 * | 9/2001 | Huff et al. | 345/644 |
| 6,288,730 B1 | 9/2001 | Duluk, Jr. et al. | 345/552 |
| 6,298,438 B1 * | 10/2001 | Thayer et al. | 712/226 |
| 6,385,632 B1 * | 5/2002 | Choe et al. | 708/270 |
| 6,577,316 B2 * | 6/2003 | Brethour et al. | 345/505 |
| 6,581,085 B1 * | 6/2003 | Yue et al. | 708/502 |
| 6,597,363 B1 * | 7/2003 | Duluk et al. | 345/506 |

FOREIGN PATENT DOCUMENTS

| | | | |
|---|---|---|---|
| WO | 97/05575 | 2/1997 | G06T/15/00 |
| WO | 97/05576 | 2/1997 | G06T/15/00 |
| WO | 98/28695 | 7/1998 | G06F/15/16 |
| WO | 99/52040 | 10/1999 | G06F/15/76 |
| WO | 00/10372 | 3/2000 | |
| WO | 00/11562 | 3/2000 | G06F/15/00 |
| WO | 00/11602 | 3/2000 | |
| WO | 00/11603 | 3/2000 | |
| WO | 00/11604 | 3/2000 | |
| WO | 00/11605 | 3/2000 | |
| WO | 00/11607 | 3/2000 | G06T/1/20 |
| WO | 00/11613 | 3/2000 | G06T/15/00 |
| WO | 00/11614 | 3/2000 | G06T/17/00 |
| WO | 00/19377 | 4/2000 | G06T/15/00 |

* cited by examiner

SYSTEM, METHOD AND COMPUTER PROGRAM PRODUCT FOR AN IMPROVED PROGRAMMABLE VERTEX PROCESSING MODEL WITH INSTRUCTION SET

RELATED APPLICATION

The present application is a continuation-in-part of applications entitled "METHOD, APPARATUS AND ARTICLE OF MANUFACTURE FOR A TRANSFORM MODULE IN A GRAPHICS PROCESSOR" filed Dec. 6, 1999 under Ser. No. 09/456,102, and "SYSTEM, METHOD AND ARTICLE OF MANUFACTURE FOR A PROGRAMMABLE VERTEX PROCESSING MODEL WITH INSTRUCTION SET" filed May 31, 2000 under Ser. No. 09/586,249, which are incorporated herein by reference in their entirety.

FIELD OF THE INVENTION

The present invention relates to computer graphics, and more particularly to providing programmability in a computer graphics processing pipeline.

BACKGROUND OF THE INVENTION

Graphics application program interfaces (API's) have been instrumental in allowing applications to be written to a standard interface and to be run on multiple platforms, i.e. operating systems. Examples of such graphics API's include Open Graphics Library (OpenGL®) and D3D™ transform and lighting pipelines. OpenGL® is the computer industry's standard graphics API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

Thus, in any computer system which supports this OpenGL® standard, the operating system(s) and application software programs can make calls according to the standard, without knowing exactly any specifics regarding the hardware configuration of the system. This is accomplished by providing a complete library of low-level graphics manipulation commands, which can be used to implement graphics operations.

A significant benefit is afforded by providing a predefined set of commands in graphics API's such as OpenGL®. By restricting the allowable operations, such commands can be highly optimized in the driver and hardware implementing the graphics API. On the other hand, one major drawback of this approach is that changes to the graphics API are difficult and slow to be implemented. It may take years for a new feature to be broadly adopted across multiple vendors.

With the impending integration of transform operations into high speed graphics chips and the higher integration levels allowed by semiconductor manufacturing, it is now possible to make part of the geometry pipeline accessible to the application writer. There is thus a need to exploit this trend in order to afford increased flexibility in visual effects. In particular, there is a need to provide a new computer graphics programming model and instruction set that allows convenient implementation of changes to the graphics API, while preserving the driver and hardware optimization afforded by currently established graphics API's.

As the geometry pipeline becomes more and more accessible to the application writer, there is a further need for the ability to execute more and more specific functions on a high speed graphics chips. Traditionally, functions such as sine, cosine, exponentials, and logarithms have been carried out utilizing a central processing unit or a texture look-up operation. Unfortunately, such prior art techniques are notorious for being resource expensive, not very accurate, and producing high latencies. There is thus a need for implementing such functions in hardware while making the same available to the application writers.

DISCLOSURE OF THE INVENTION

A system, method and computer program product are provided for branching during programmable processing in a computer graphics pipeline. Initially, data is received. Programmable operations are then performed on the data in order to generate output. Such operations are programmable by a user utilizing instructions from a predetermined instruction set. When performing the programmable operations in the foregoing manner, programmable branching may take place between the programmable operations. Subsequently, the output is stored in memory.

In one embodiment, the programmable operations may be branched to labels. Further, the labels may be stored in a table. The programmable operations may thus be branched to indexes in the table. Further, each index may be stored in an address register. As an option, each index may be calculated.

In another embodiment, the programmable operations may be branched based on condition codes. Such condition codes may be sourced as EQ(equal), NE(not equal), LT(less), GE(greater or equal), LE(less or equal), GT(greater), FL(false), and/or TR(true). Optionally, the condition codes may be maskable. Further, the condition codes may be swizzled.

In addition to being used during branching, the condition codes may be utilized to control write masks. As an option, the write masks may be controlled utilizing an AND operation involving the write masks and the condition codes.

In still another embodiment, the programmable operations may be terminated after a predetermined number of operations have been performed to prevent the computer graphics pipeline from hanging.

In use, the operations may include a branch operation, a call operation, a return operation, a cosine operation, a sine operation, a floor operation, a fraction operation, a set-on-equal-to operation, a set false operation, a set-on-greater-than, a set-on-less-than-or-equal operation, a set-on-not-equal-to operation, a set true operation, a no operation, address register load, move, multiply, addition, multiply and addition, reciprocal, reciprocal square root, three component dot product, four component dot product, distance vector, minimum, maximum, set on less than, set on greater or equal than, exponential base two (2), logarithm base two (2), exponential, logarithm, and/or light coefficients.

A system is thus provided for branching during programmable vertex processing. Included is a source buffer for storing data. Also included is a functional module coupled to the source buffer for performing programmable operations on the data received therefrom in order to generate output. Such operations are programmable by a user utilizing instructions from a predetermined instruction set. Coupled to the functional module is a register for storing the output. In use, the functional module is capable of branching between the programmable operations.

As mentioned earlier, various functions such as sine and cosine may be executed by the previous embodiment. To execute such functions, a system and method are provided for directly executing a function in a computer graphics pipeline. Initially, input data is received in the computer graphics pipeline. A mathematical function is directly performed on the input data in order to generate output data. It should be noted that the mathematical function is directly performed in the computer graphics pipeline without a texture look-up or significant or any aid from a central processing unit. Next, the output data is stored in memory on the computer graphics pipeline.

In one embodiment, the mathematical function may include a sine, cosine, or various other functions such as tangent, arctangent, exponent, logarithm, antilogarithm, hyperbolic sine, hyperbolic cosine, hyperbolic tangent, and/or hyperbolic arctangent. Moreover, the input data may be in a floating-point format.

In use, the mathematical function may be performed utilizing a Taylor Series or a cordic algorithm. Still yet, the input data may be converted from a first coordinate system to a second coordinate system. Further, the mathematical function may be carried out in one cycle in the computer graphics pipeline.

In another embodiment, after the input data is received, the particular function to be executed on the input data may initially be identified. Thus, pre-processing of the input data may be carried out based on the function to be executed on the input data utilizing the computer graphics pipeline. Next, the input data may be processed utilizing a plurality of operations independent of the function to be executed on the input data utilizing the computer graphics pipeline. Subsequently, post-processing may be carried out on the input data to generate output data utilizing the computer graphics pipeline. As mentioned earlier, such output data may be stored in memory on the computer graphics pipeline.

In one aspect of the present embodiment, the pre-processing may include adding a one (1) to the phase (i.e., the quadrant) of the input data if the function to be executed on the input data is cosine. Moreover, the pre-processing may include multiplying the input data by $(1/(2\pi)+1)$ if the function to be executed on the input data is either sine or cosine. Still yet, the pre-processing may include performing a conditional 1's complement operation on the input data if the function to be executed on the input data is either sine or cosine. As an option, the preprocessing may include performing a barrel shift operation on the input data if the function to be executed on the input data is the exponent operation. It should be noted that the sin(x) and cos(x) functions may include an argument x that is in either degrees or radians.

In another aspect of the present embodiment, the processing may include extracting a set of most significant bits and a set of least significant bits from a mantissa associated with the input data. Further, the processing may include conditionally adding a one (1) to the most significant bits. As an option, the processing may include looking up information in a plurality of tables, and calculating a Taylor Series. Such information may include a plurality of derivatives for being summed in the Taylor Series. As an option, the tables may be utilized based on the function to be executed on the input data. Moreover, the tables may be hard-coded or programmable, and loaded at runtime.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
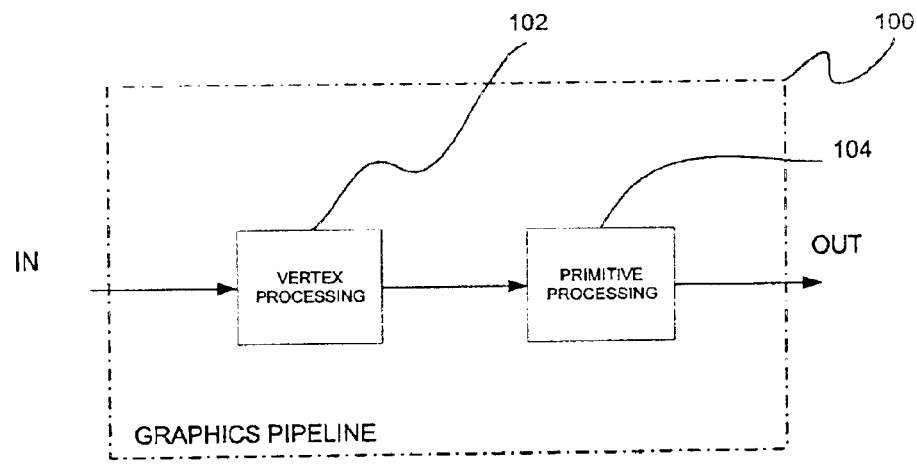
FIG. 1 is a conceptual diagram illustrating a graphics pipeline in accordance with one embodiment of the present invention.

FIG. 1 is a conceptual diagram illustrating a graphics pipeline 100 in accordance with one embodiment of the present invention. During use, the graphics pipeline 100 is adapted to carry out numerous operations for the purpose of processing computer graphics. Such operations may be categorized into two types, namely vertex processing 102 and primitive processing 104. At least partially during use, the vertex processing 102 and primitive processing 104 adhere to a standard graphics application program interface (API) such as OpenGL® or any other desired graphics API.

Vertex processing 102 normally leads primitive processing 104, and includes well known operations such as texgen operations, lighting operations, transform operations, and/or any other operations that involve vertices in the computer graphics pipeline 100.

Primitive processing 104 normally follows vertex processing 102, and includes well known operations such as culling, frustum clipping, polymode operations, flat shading, polygon offsetting, fragmenting, and/or any other operations that involve primitives in the computer graphics pipeline 100. It should be noted that still other operations may be performed such as viewport operations.

Figure 2:
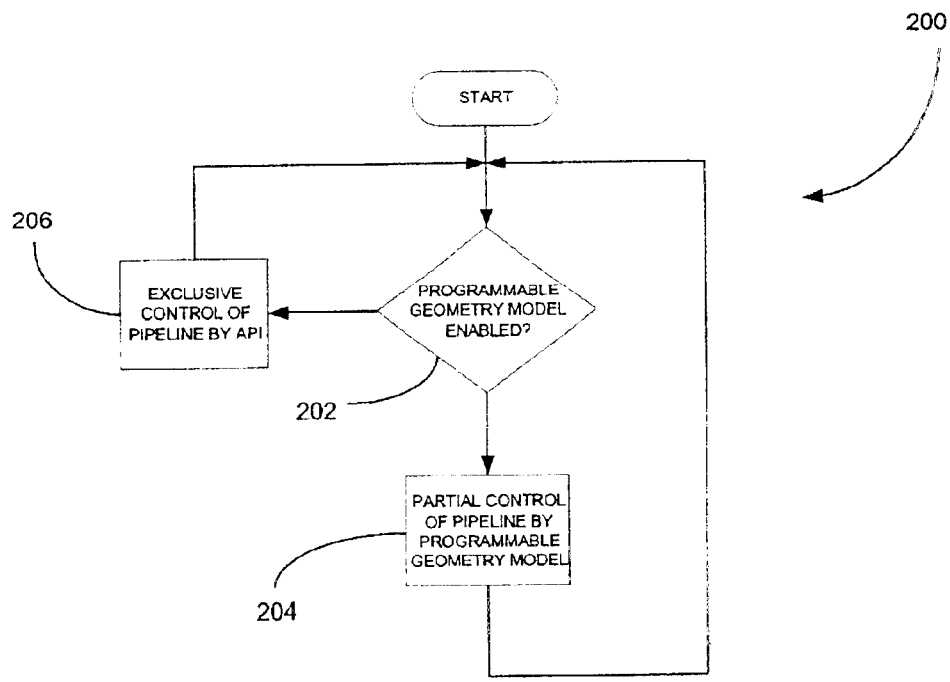
FIG. 2 illustrates the overall operation of the various components of the graphics pipeline of FIG. 1.

FIG. 2 illustrates a high level operation 200 of the graphics pipeline 100 of FIG. 1. As shown, it is constantly determined in decision 202 whether current operation invokes a programmable geometry model of the present invention. If so, a mode is enabled that partially supercedes the vertex processing 102 of the standard graphics API, thus providing increased flexibility in generating visual effects. See operation 204.

When disabled, the present invention allows increased or exclusive control of the graphics pipeline 100 by the standard graphics API, as indicated in operation 206. In one embodiment, states of the standard graphics API state may not be overruled by invoking the programmable geometry mode of the present invention. In one embodiment, no standard graphics API state may be directly accessible by the present invention.

In one embodiment of the present invention, the programmable geometry mode of the present invention may optionally be limited to vertex processing from object space into homogeneous clip space. This is to avoid compromising hardware performance that is afforded by allowing exclusive control of the primitive processing 104 by the standard graphics API at all times.

The remaining description will be set forth assuming that the programmable geometry mode supersedes the standard graphics API only during vertex processing 102. It should be noted, however, that in various embodiments of the present invention, the programmable geometry mode may also supersede the standard graphics API during primitive processing 104.

Figure 3:
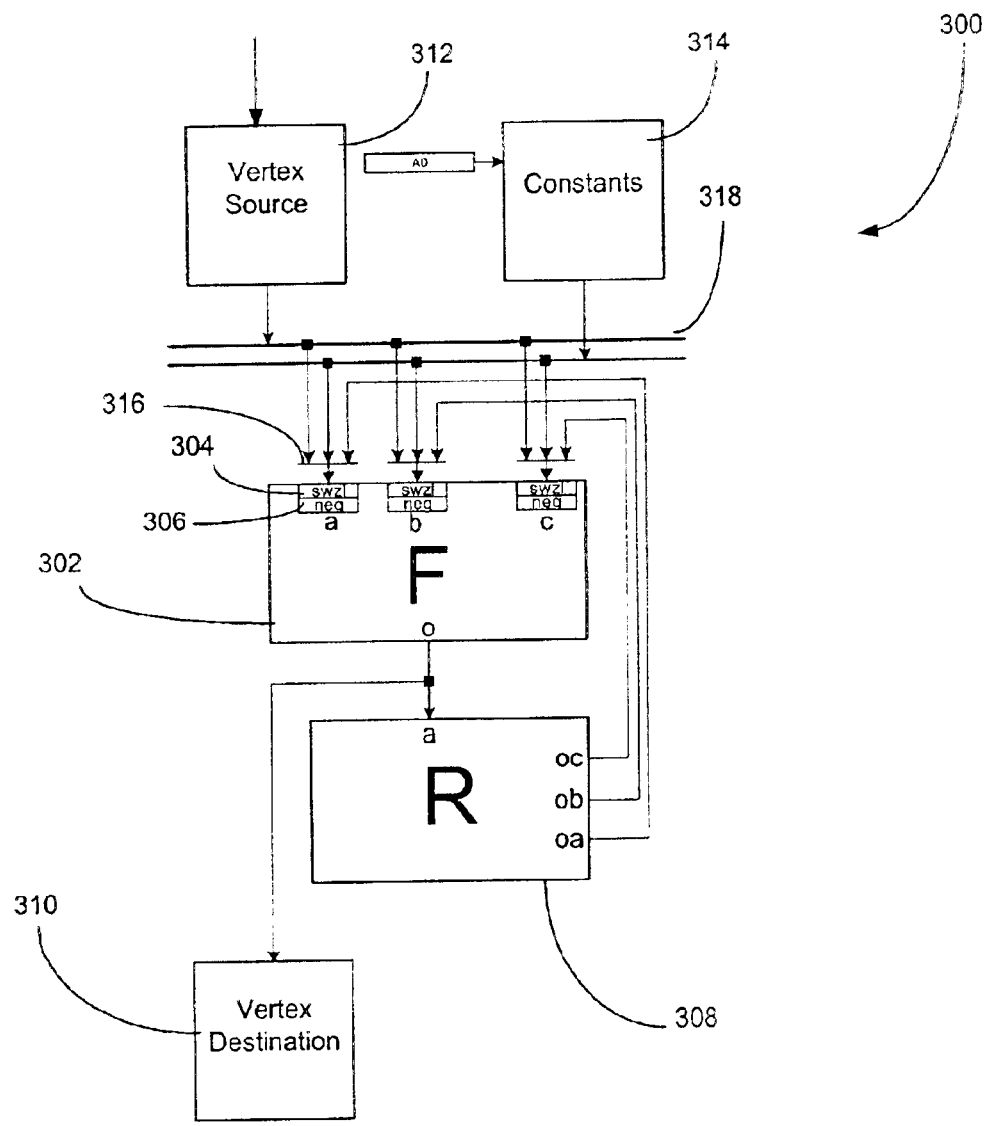
FIG. 3 is a schematic illustrating one embodiment of a programming model in accordance with the present invention.

FIG. 3 is a schematic illustrating one embodiment of a programming model 300 in accordance with the present invention. Such programming model 300 may be adapted to work with hardware accelerators of various configuration and/or with central processing unit (CPU) processing.

As shown in FIG. 3, the programming module 300 includes a functional module 302 that is capable of carrying out a plurality of different types of operations. The functional module 302 is equipped with three inputs and an output. Associated with each of the three inputs is a swizzling module 304 and a negating module 306 for purposes that will be set forth hereinafter in greater detail.

Coupled to the output of the functional module 302 is an input of a register 308 having three outputs. Also coupled to the output of the functional module 302 is a vertex destination buffer 310. The vertex destination buffer 310 may include a vector component write mask, and may preclude read access.

Also included are a vertex source buffer 312 and a constant source buffer 314. The vertex source buffer 312 stores data in the form of vertex data, and may be equipped with write access and/or at least single read access. The constant source buffer 314 stores data in the form of constant data, and may also be equipped with write access and/or at least single read access.

Each of the inputs of the functional module 302 is equipped with a multiplexer 316. This allows the outputs of the register 308, vertex source buffer 312, and constant source buffer 314 to be fed to the inputs of the functional module 302. This is facilitated by buses 318.

Figure 4:
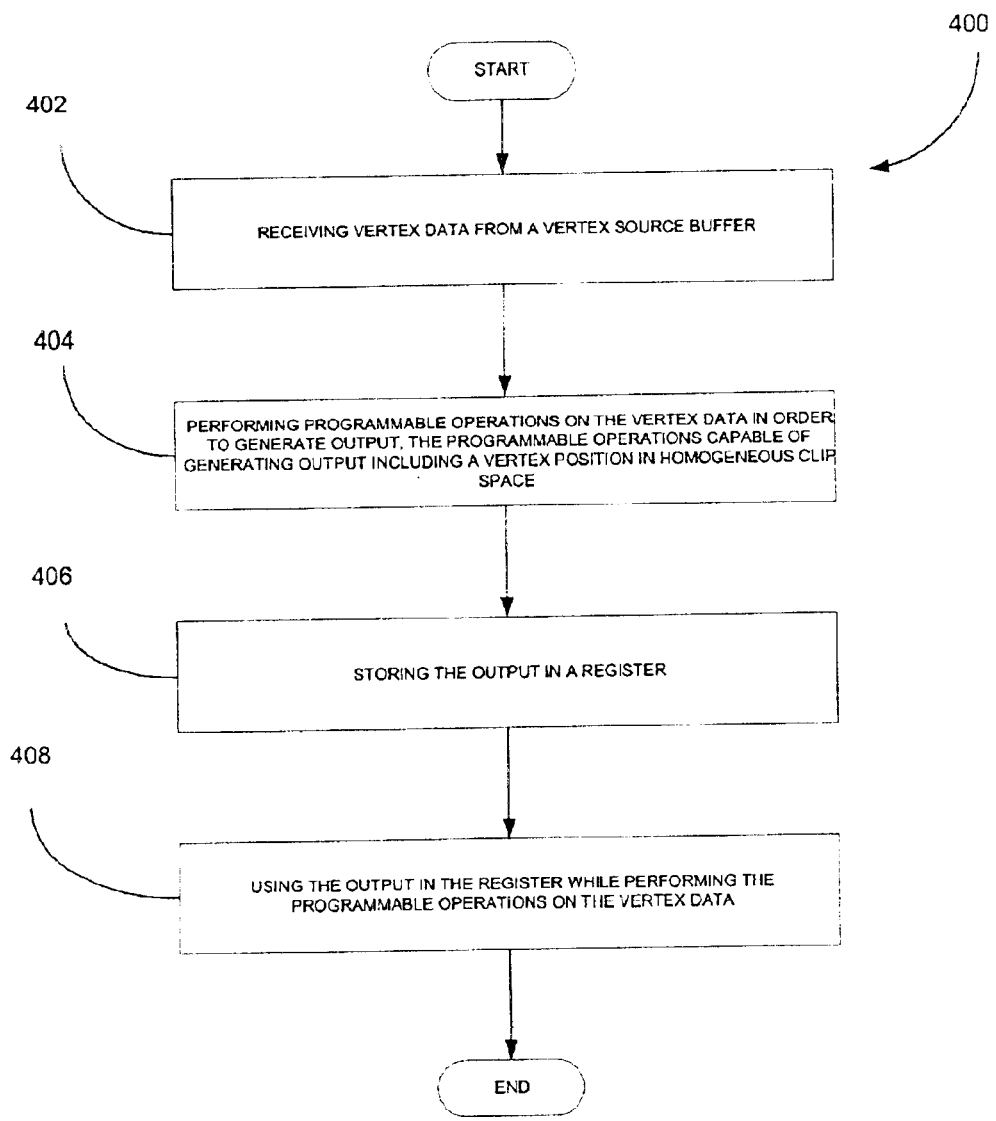
FIG. 4 is a flowchart illustrating the method by which the programming model of FIG. 3 carries out programmable vertex processing in the computer graphics pipeline.

FIG. 4 is a flowchart illustrating the method 400 by which the model of FIG. 3 carries out programmable vertex processing in the computer graphics pipeline 100. Initially, in operation 402, data is received from a vertex source buffer 312. Such data may include any type of information that is involved during the processing of vertices in the computer graphics pipeline 100. Further, the vertex source buffer 312 may include any type of memory capable of storing data.

Thereafter, in operation 404, programmable operations, i.e. vertex processing 102, are performed on the data in order to generate output. The programmable operations are capable of generating output including at the very least a position of a vertex in homogeneous clip space. In one embodiment, such position may be designated using Cartesian coordinates each with a normalized range between −1.0 and 1.0. As will soon become apparent, branching may occur between the programmable operations. Further, conditional codes may be used during the course of such branching, as well as in conjunction with write masks.

The output is then stored in the register 308 in operation 406. During operation 408, the output stored in the register 308 is used in performing the programmable operations on the data. Thus, the register 308 may include any type of memory capable of allowing the execution of the programmable operations on the output.

By this design, the present invention allows a user to program a portion of the graphics pipeline 100 that handles vertex processing. This results in an increased flexibility in generating visual effects. Further, the programmable vertex processing of the present invention allows remaining portions of the graphics pipeline 100 to be controlled by the standard application program interface (API) for the purpose of preserving hardware optimizations.

During operation, only one vertex is processed at a time in the functional module 302 that performs the programmable operations. As such, the vertices may be processed independently. Further, the various foregoing operations may be processed for multiple vertices in parallel.

In one embodiment of the present invention, a constant may be received, and the programmable operations may be performed based on the constant. During operation, the constant may be stored in and received from the constant source buffer 314. Further, the constant may be accessed in the constant source buffer 314 using an absolute or relative address. As an option, there may be one address register for use during reads from the constant source buffer 314. It may be initialized to 0 at the start of program execution in operation 204 of FIG. 2. Further, the constant source buffer 314 may be written with a program which may or may not be exposed to users.

The register 308 may be equipped with single write and triple read access. Register contents may be initialized to (0,0,0,0) at the start of program execution in operation 204 of FIG. 2. It should be understood that the output of the functional module 302 may also be stored in the vertex destination buffer 310. The vertex position output may be stored in the vertex destination buffer 310 under a predetermined reserved address. The contents of the vertex destination buffer 310 may be initialized to (0,0,0,1) at the start of program execution in operation 204 of FIG. 2.

As an option, the programmable vertex processing may include negating the data, as well as calculating an absolute value. Still yet, the programmable vertex processing may also involve swizzling the data. Data swizzling is useful when generating vectors. Such technique allows the efficient generation of a vector cross product and other vectors.

In one embodiment, the vertex source buffer 312 may be 16 quad-words in size (16*128 bits). Execution of the present invention may be commenced when Param[0]/Position is written. All attributes may be persistent. That is, they remain constant until changed. Table 1 illustrates the framework of the vertex source buffer 312. It should be noted that the number of textures supported may vary across implementations.

TABLE 1

| Program Mode | | Standard API | |
| --- | --- | --- | --- |
| Param[0] | X,Y,Z,W | Position | X,Y,Z,W |
| Param[1] | X,Y,Z,W | Skin Weights | W,W,W,W |
| Param[2] | X,Y,Z,W | Normal | X,Y,Z,* |
| Param[3] | X,Y,Z,W | Diffuse Color | R,G,B,A |
| Param[4] | X,Y,Z,W | Specular Color | R,G,B,A |
| Param[5] | X,Y,Z,W | Fog | F,*,*,* |
| Param[6] | X,Y,Z,W | Point Size | P,*,*,* |
| Param[7] | X,Y,Z,W | | *,*,*,* |
| Param[8] | X,Y,Z,W | Texture0 | S,T,R,Q |
| Param[9] | X,Y,Z,W | Texture1 | S,T,R,Q |

TABLE 1-continued

| Program Mode | | Standard API | |
|---|---|---|---|
| Param[10] | X,Y,Z,W | Texture2 | S,T,R,Q |
| Param[11] | X,Y,Z,W | Texture3 | S,T,R,Q |
| Param[12] | X,Y,Z,W | Texture4 | S,T,R,Q |
| Param[13] | X,Y,Z,W | Texture5 | S,T,R,Q |
| Param[14] | X,Y,Z,W | Texture6 | S,T,R,Q |
| Param[15] | X,Y,Z,W | Texture7 | S,T,R,Q |

In another embodiment, the vertex destination buffer 310 may be 15 or so quad-words in size and may be deemed complete when the program is finished. The following exemplary vertex destination buffer addresses are pre-defined to fit a standard pipeline. Contents are initialized to (0,0,0,1) at start of program execution in operation 204 of FIG. 2. Further, a vector condition code register is initialized as equal to 0.0 at the start of program. Writes to locations that are not used by the downstream hardware may be ignored.

A reserved address (HPOS) may be used to denote the homogeneous clip space position of the vertex in the vertex destination buffer 310. It may be generated by the geometry program. Table 2 illustrates the various locations of the vertex destination buffer 310 and a description thereof.

TABLE 2

| Location | Description | |
|---|---|---|
| HPOS | HClip Position | x,y,z,w (−1.0 to 1.0) |
| BCOL0 | Back Color0 (diff) | r,g,b,a (0.0 to 1.0) |
| BCOL1 | Back Color1 (spec) | r,g,b,a (0.0 to 1.0) |
| COL0 | Color0 (diff) | r,g,b,a (0.0 to 1.0) |
| COL1 | Color1 (spec) | r,g,b,a (0.0 to 1.0) |
| FOGP | Fog Parameter | f,*,*,* |
| PSIZ | Point Size | p,*,*,* |
| PDIS0 | Planar Distance0 | d,*,*,* |
| PDIS1 | Planar Distance1 | d,*,*,* |
| PDIS2 | Planar Distance2 | d,*,*,* |
| PDIS3 | Planar Distance3 | d,*,*,* |
| PDIS4 | Planar Distance4 | d,*,*,* |
| PDIS5 | Planar Distance5 | d,*,*,* |
| TEX0 | Texture0 | s,t,r,q |
| TEX1 | Texture1 | s,t,r,q |
| TEX2 | Texture2 | s,t,r,q |
| TEX3 | Texture3 | s,t,r,q |
| TEX4 | Texture4 | s,t,r,q |
| TEX5 | Texture5 | s,t,r,q |
| TEX6 | Texture6 | s,t,r,q |
| TEX7 | Texture7 | s,t,r,q |

HPOS - homogeneous clip space position float[4] x,y,z,w - standard graphics pipeline process further (clip check, perspective divide, viewport scale and bias).
COL0/BCOL0 - color0 (diffuse)
COL1/BCOL1 - color1 (specular) float[4] r,g,b,a - each component gets clamped to (0.0, 1.0) before interpolation - each component is interpolated at least as 8-bit unsigned integer.
TEX0-7 - textures 0 to 7 float[4] s,t,r,q - each component is interpolated as high precision float, followed by division of q and texture lookup. Extra colors could use texture slots. Advanced fog can be done as a texture.
FOGP fog parameter float[1] f (distance used in fog equation) - gets interpolated as a high precision float and used in a fog evaluation (linear, exp, exp2) generating a fog color blend value.
PSIZ point size float[1] p - gets clamped to (0.0,POINT_SIZE_MAX) and used as point size.
PDIS0-5 planar distances float[6] pd0-pd5 used for clipping to 6 arbitrary planes An exemplary assembly language that may be used in one implementation of the present invention will now be set forth. In one embodiment, no branching instructions may be allowed for maintaining simplicity. It should be noted, however, that branching may be simulated using various combinations of operations. Table 3 illustrates a list of the various resources associated with the programming model 300 of FIG. 3. Also shown is a reference format associated with each of the resources along with a proposed size thereof.

TABLE 3

| Resources: | | |
|---|---|---|
| Vertex Source | - v[*] | of size 16 vectors |
| Constant Memory | - c[*] | of size 256 vectors |
| Address Register | - A0.x | of size 1 signed integer vector |
| Data Registers | - R0–R15 | of size 16 vectors |
| Condition Codes | - CC | of size 1 vector |
| Vertex Destination | - o[*] | of size 17 vectors |
| Instruction Storage | | of size 256 instructions |

Note: Data Registers, Source, and Constants may be four component floats. The address register may be a vector of 4 signed integers.

For example, the constant source buffer 314 may be accessed as c[*] (absolute) or as c[A0.x+*], c[A0.y+*], c[A0.z+*], c[A0.w+*] (relative). In the relative case, a 32-bit signed address register may be added to the non-negative read address. Out of range address reads may result in (0,0,0,0). In one embodiment, the vertex source buffer 312, vertex destination buffer 310, and register 308 may not use relative addressing.

Vector components may be swizzled before use via four subscripts (xyzw). Accordingly, an arbitrary component re-mapping may be done. Examples of swizzling commands are shown in Table 4.

TABLE 4

.xyzw means source(x,y,z,w) → input(x,y,z,w)
.zzxy means source(x,y,z,w) → input(z,z,x,y)
.xxxx means source(x,y,z,w) → input(x,x,x,x)

Table 5 illustrates an optional shortcut notation of the assembly language that maybe permitted.

TABLE 5

No subscripts is the same as .xyzw
.x is the same as .xxxx
.y is the same as .yyyy
.z is the same as .zzzz
.w is the same as .wwww All source operands may be negated by putting a '−' sign in front of the above notation. Moreover, an absolute value of the source operands may be calculated.

The condition codes (CC) may be changed whenever data is written (by adding a 'c' to the opcode) and shares the writemask with the destination. If there is no other destination, condition codes may be used as a dummy write register.

The condition codes are sourced as EQ(equal), NE(not equal), LT(less), GE(greater or equal), LE(less or equal), GT(greater), FL(false), and TR(true), which generates 4-bits of condition code by applying the specified comparison. As a source (for branch and writemask modification), the condition codes may be swizzled.

Initially, each component is compared to 0.0 and its status recorded in a condition code status register if the writemask for that component is enabled. Table 5A illustrates various exemplary statuses that may be stored based on the comparison.

TABLE 5A

```
If(x == 0)
    EQ = 1
else
    EQ = 0
If(x < 0)
    LT = 1
else
    LT = 0
If(x is not a number (NAN))
    NAN = 1
else
    NAN = 0
```

When data is written, the condition code status register is evaluated based on a user-defined comparison. Table 5B illustrates an exemplary evaluation.

TABLE 5B

| | |
|---|---|
| if(x <= 0) | |
| if(NAN) | → False |
| else if(LT) | → True |
| else if(EQ) | → True |
| else | → False |

Writes to the register 308, vertex destination buffer 310, and the condition codes are maskable. Each component is written only if it appears as a destination subscript (from xyzw). No swizzling is possible for writes and subscripts are ordered (x before y before z before w). It is also possible to modify the write mask by the condition codes (at the beginning of the instruction) by an 'AND' operation in a manner shown in Table 6. It should be noted that the condition codes (sourced as EQ, NE, LT, GE, LE, GT, FL, TR) have swizzle control here.

TABLE 6

| | |
|---|---|
| destination(GT.x) | //writemask[4] = 1111 & GT.xxxx |
| destination.xw(EQ.yyzz) | //writemask[4] = 1001 & EQ.yyzz |

An exemplary assembler format is as follows:
OPCODE[c] DESTINATION,SOURCE(S);

Generated data maybe written to the register 308, the vertex buffer 310, or the condition codes RC. Output data may be taken from the functional module 302. Table 6A illustrates commands in the proposed assembler format which write output to the register 308 or the vertex destination buffer 310.

TABLE 6A

| | |
|---|---|
| ADDC R4,R1,R2; | //result goes into R4, update CC |
| ADD o[HPOS],R1,R2; | //result goes into the destination buffer |
| ADD R4.xy,R1,R2; | //result goes into x,y components of R4 |
| ADDc CC.xy(GT.w),R1,R2; | //GT.w ? CC.xy = ADD results compared to 0.0 |

During operation, the programmable vertex processing is adapted for carrying out various instructions of an instruction set using any type of programming language including, but not limited to that set forth hereinabove. Such instructions may include, but are not limited to a branch operation, a call operation, a return operation, a cosine operation, a sine operation, a floor operation, a fraction operation, a set-on-equal-to operation, a set false operation, a set-on-greater-than operation, a set-on-less-than-or-equal operation, a set-on-not-equal-to operation, a set true operation, a no operation, address register load, move, multiply, addition, multiply and addition, reciprocal, reciprocal square root, three component dot product, four component dot product, distance vector, minimum, maximum, set on less than, set on greater or equal than, exponential base two (2), logarithm base two (2), exponential, logarithm, and/or light coefficients. Table 7 illustrates the operation code associated with each of the foregoing instructions. Also indicated is a number of inputs and outputs as well as whether the inputs and outputs are scalar or vector.

TABLE 7

| OPCODE | INPUT(scalar or vector) | OUTPUT(scalar or vector) |
|---|---|---|
| ADD[c] | v,v | v |
| ARL | v | v |
| BRA | CC | |
| CAL | CC | |
| COS[c] | s | ssss |
| DP3[c] | v,v | ssss |
| DP4[c] | v,v | ssss |
| DST[c] | v,v | v |
| EX2[c] | s | ssss |
| EXP[c] | s | v |
| FLR[c] | v | v |
| FRC[c] | v | v |
| LG2[c] | s | ssss |
| LIT[c] | v | v |
| LOG[c] | s | v |
| MAD[c] | v,v,v | v |
| MAX[c] | v,v | v |
| MIN[c] | v,v | v |
| MOV[c] | v | v |
| MUL[c] | v,v | v |
| NOP | | |
| RET | CC | |
| RCP[c] | s | ssss |
| RSQ[c] | s | ssss |
| SEQ[c] | v,v | v |
| SFL[c] | v,v | v |
| SGE[c] | v,v | v |
| SGT[c] | v,v | v |
| SIN[c] | s | ssss |
| SLE[c] | v,v | v |
| SLT[c] | v,v | v |
| SNE[c] | v,v | v |
| STR[c] | v,v | v |

As shown in Table 7, each of the instructions includes an input and an output which may take the form of a vector and/or a scalar. It should be noted that such vector and scalar inputs and outputs may be handled in various ways. Further information on dealing with such inputs and outputs may be had by reference to a co-pending application entitled "METHOD, APPARATUS AND ARTICLE OF MANUFACTURE FOR A TRANSFORM MODULE IN A GRAPHICS PROCESSOR" filed Dec. 6, 1999 under Ser. No. 09/456,102 which is incorporated herein by reference in its entirety.

These various instructions may each be carried out using a unique associated method and data structure. Such data structure includes a source location identifier indicating a source location of data to be processed. Such source location may include a plurality of components. Further provided is a source component identifier indicating in which of the plurality of components of the source location the data resides. The data may be retrieved based on the source location identifier and the source component identifier. This way, the operation associated with the instruction at hand may be performed on the retrieved data in order to generate output.

Also provided is a destination location identifier for indicating a destination location of the output. Such destination location may include a plurality of components. Further, a destination component identifier is included indicating in which of the plurality of components of the destination location the output is to be stored. In operation, the output is stored based on the destination location identifier and the destination component identifier.

Figure 5:
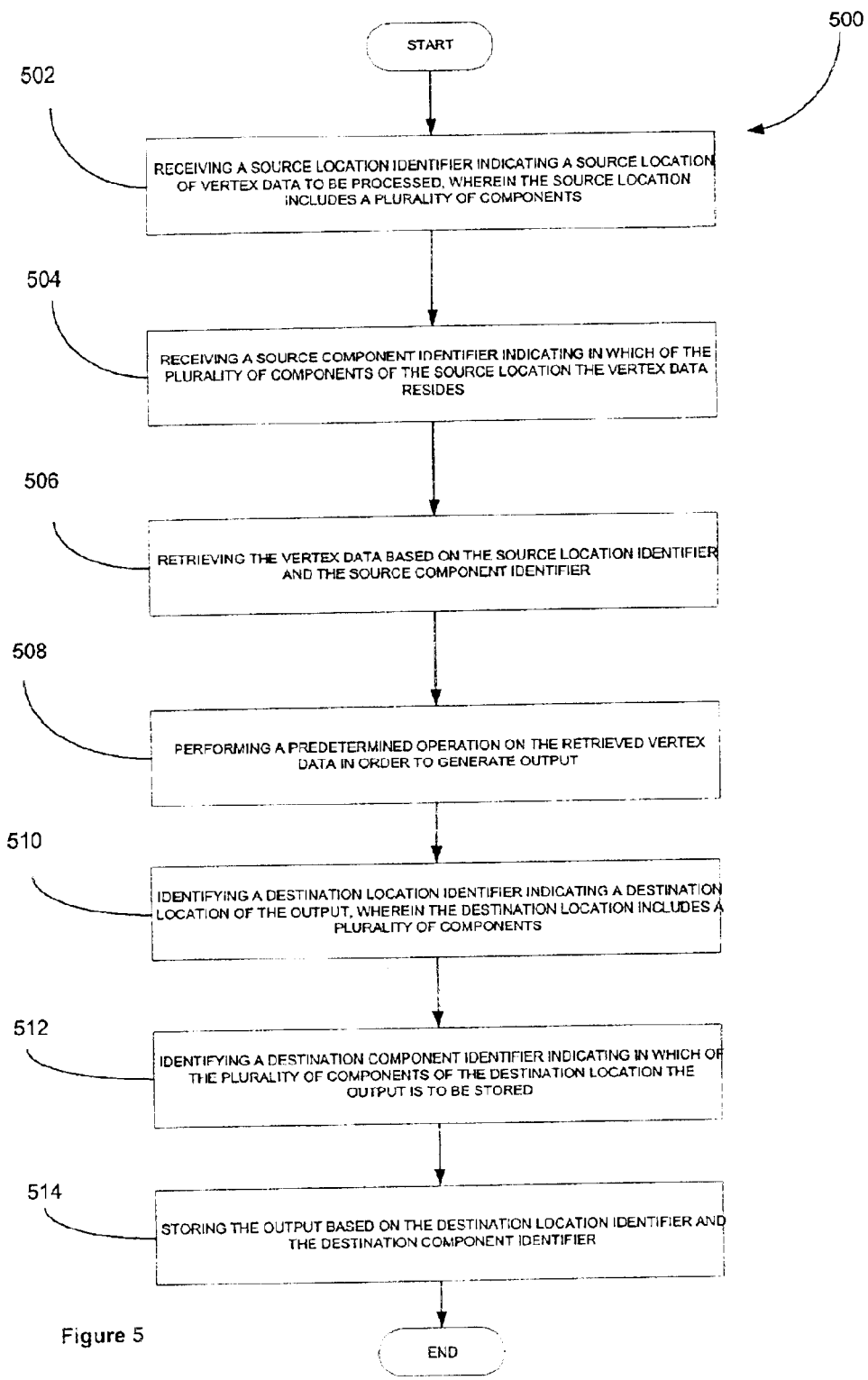
FIG. 5 is a flowchart illustrating the method in a data structure is employed to carry out graphics instructions in accordance with one embodiment of the present invention.

FIG. 5 is a flowchart illustrating the method 500 in which the foregoing data structure is employed in carrying out the instructions in accordance with one embodiment of the present invention. First, in operation 502, the source location identifier is received indicating a source location of data to be processed. Thereafter, in operation 504, the source component identifier is received indicating in which of the plurality of components of the source location the data resides.

The data is subsequently retrieved based on the source location identifier and the source component identifier, as indicated in operation 506. Further, the particular operation is performed on the retrieved data in order to generate output. See operation 508. The destination location identifier is then identified in operation 510 for indicating a destination location of the output. In operation 512, the destination component identifier is identified for indicating in which of the plurality of components of the destination location the output is to be stored. Finally, in operation 514, the output is stored based on the destination location identifier and the destination component identifier.

As an option, branching among programmable operations may be carried out in the context of the present embodiment. Table 7A illustrates a possible general structure of a vertex program with branching.

TABLE 7A

| ||VP2.0 | |
|---|---|
| LABEL: | // label table start, only used for indexed branch |
|     0:NV_START | // index 0 |
|     2:LBL3 | // index 2 |
|     1:LBL_HI | // index 1 |
| CODE: | |
| MAIN: | // entry point |
|     OpCode | |
|     Opcode | |
|     OpCode | |
|     ... | |
| LBL_HI: | // branch target |
|     OpCode | |
| LBL1: | // branch target |
|     OpCode | |
|     RET | // end of MAIN |
| NV_START: | // subroutine |
|     OpCode | |
|     ... | |
|     RET | // end of subroutine |
| LBL3: | // subroutine |
|     OpCode | |
|     ... | |
|     RET | // end of subroutine |
| END | |

It should be noted that the program of Table 7A is divided into a number of sections. Table 7B sets forth each of such sections.

TABLE 7B 1. a header of ||VP2.0
2. an optional LABEL (reserved keyword) block containing the labels in the program that the programmer wants indexed. Up to 8 labels can be indexed from 0 to 7
3. a mandatory CODE (reserved keyword) block
4. a mandatory MAIN (reserved keyword) entry point (must be in CODE block)
5. a mandatory END (reserved keyword)

It should be understood that branches/calls/returns are conditional, based on the condition code register. Moreover, branches/calls may be done to any label or to the index stored in an address register. In one embodiment, only a certain number (i.e. 16) of indexes may exist. Trying to access an uninitialized index may terminate the program.

As an option, there may be an address stack for use by subroutine call/return. Such address stack may be of depth four (4). In such embodiment, a call attempting to push a fifth ($5^{th}$) return address may terminate the program. Further, a return attempting to pop an empty address stack will terminate the program.

To prevent the hardware from hanging, any program may be terminated after executing a certain number of instructions (i.e. $65536^{th}$ instruction). If a program is prematurely terminated, the current state of the output buffer may be the final program output.

Further information will now be set forth regarding each of the instructions set forth in Table 7. In particular, an exemplary format, description, operation, and examples are provided using the programming language set forth earlier.

Address Register Load (ARL)

Format

ARL A0[.xyzw][(CC[.xyzw])],[−]S0[.xyzw]

Description

The contents of source scalar are moved into a specified address register. Source may have one subscript. Destination may have an ".xyz" subscript. In one embodiment, the only valid address register may be designated as "A0.x." The address register "A0.x" may be used as a base address for constant reads. The source may be a float that is truncated towards negative infinity into a signed integer. In one embodiment, ARL cannot modify the condition codes.

Operation

Table 8A sets forth an example of operation associated with the ARL instruction.

TABLE 8A

```
t.x = source0.c***;    /* c is x or y or z or w */
t.y = source0.*c**;
t.z = source0.**c*;
t.w = source0.***c;
if (−source0)
    t = −t;
q.x = floor(t.x);
q.y = floor(t.y);
q.z = floor(t.z);
q.w = floor(t.w);
if (destination.x) A0.x = q.x;
if (destination.y) A0.y = q.y;
if (destination.z) A0.z = q.z;
if (destination.w) A0.w = q.w;
```

EXAMPLES

ARL A0.x,v[7].w (move vertex scalar into address register 0)

MOV R6,c[A0.x+7] (move constant at address A0.x+7 into register R6)

Branch,Call,Return (BRA,CAL,RET)

Format

BRA CC[.xyzw],Label

BRA CC[.xyzw],A0.[xyzw]+Imm

CAL CC[.xyzw],Label

CAL CC[.xyzw],A0.[xyzw]+Imm

RET CC[.xyzw]

Description

Conditional branch, subroutine call, and subroutine return are set forth herein. Condition is based on the condition code bits ORed together after a swizzle operation. A taken CAL pushes the return address only onto a stack. A taken RET pops the return address off this stack. The address register may be a scalar and the immediate constant between 0–255 is added to it, the sum clamped to 0–7 and then used as the index of the label to branch to. Branch/Call/Return cannot modify CC. The default branch condition is TR.

Operation

Table 8B sets forth an example of operation associated with the BRA, CAL, RET instruction.

TABLE 8B

```
b.x = RC.c***;      /* c is x or y or z or w */
b.y = RC.*c**;
b.z = RC.**c*;
b.w = RC.***c;
f.x = Evaluate(Condition,b.x);
f.y = Evaluate(Condition,b.y);
f.z = Evaluate(Condition,b.z);
f.w = Evaluate(Condition,b.w);
if (f.x | f.y | f.z | f.w)
    branch/call/return;
```

EXAMPLES

BRA GT.x,Label_0; //Branch to Label_0 if CC.x is >0.0

CAL TR,A0.z+2; //Call to jumptable[A0.z+2]

RET LE.xxzz; //Return from CAL if CC.x or CC.z is <=0.0

Cosine (COS)

Format

COS[c] D[.xyzw][(CC[.xyzw])],[-]S0.[xyzw]

Description

A cosine function is provided. The source should be a scalar. Input may be an unbounded angle in radians.

Operation

Table 8C sets forth an example of operation associated with the COS instruction.

TABLE 8C

```
t.x = source0.c***;    /* c is x or y or z or w */
t.y = source0.*c**;
t.z = source0.**c*;
t.w = source0.***c;
if (-source0)
    t = -t;
q.x = q.y = q.z = q.w = COS(t.x);    where
|ieee_cos(t.x)-COS(t.x)| < 1/(2**22) for 0.0 <= t.x < 2PI
```

TABLE 8C-continued

```
if (destination.x) R.x = q.x;
if (destination.y) R.y = q.y;
if (destination.z) R.z = q.z;
if (destination.w) R.w = q.w;
```

EXAMPLES

COS R0,R3.w;

Exponential Base 2 (EX2)

Format

EX2[c] D[.xyzw][(CC[.xyzw])],[-]S0.[xyzw]

Description

Provided is an exponential base2 instruction that accepts a scalar source0.

EX2(-Inf) or underflow gives (0.0,0.0,0.0,0.0)

EX2(+Inf) or overflow gives (+Inf,+Inf,+Inf,+Inf)

Operation

Table 8D sets forth an example of operation associated with the EX2 instruction.

TABLE 8D

```
t.x = source0.c***;    /* c is x or y or z or w */
t.y = source0.*c**;
t.z = source0.**c*;
t.w = source0.***c;
if (-source0)
    t = -t;
tmpA = FLR(t.x);
tmpB = FRC(t.x);
/* 0.0 <= tmpB < 1.0 */
q.x = q.y = q.z = q.w = 2^(tmpA) * 2^(tmpB);
where |ieee_exp(tmpB*LN2) -EX2(tmpB)| < 1/(2**22)
if (destination.x) R.x = q.x;
if (destination.y) R.y = q.y;
if (destination.z) R.z = q.z;
if (destination.w) R.w = q.w;
```

EXAMPLES

EX2 R4,R3.z;

Floor (FLR)

Format

FLR[c] D[.xyzw][(CC[.xyzw])],[-]S0.[xyzw]

Description

The present instruction sets the destination to the floor of the source.

Operation

Table 8E sets forth an example of operation associated with the FLR instruction.

TABLE 8E

```
t.x = source0.c***;    /* c is x or y or z or w */
t.y = source0.*c**;
t.z = source0.**c*;
t.w = source0.***c;
if (-source0)
    t = -t;
q.x = floor(t.x) ;
q.y = floor(t.y) ;
q.z = floor(t.z) ;
q.w = floor(t.w) ;
if (destination.x) R.x = q.x;
if (destination.y) R.y = q.y;
if (destination.z) R.z = q.z;
if (destination.w) R.w = q.w;
```

EXAMPLES

FLR R4.z,R3; //R4.z=floor(R3.z)

Fraction (FRC)

Format

FRC[c] D[.xyzw][(CC[.xyzw])],[-]S0[.xyzw]

Description

The present description set the destination to a fractional part of the source. The fraction is 0.0<=fraction<1.0.

Operation

Table 8F sets forth an example of operation associated with the FRC instruction.

TABLE 8F

```
t.x = source0.c***;           /* c is x or y or z or w */
t.y = source0.*c**;
t.z = source0.**c*;
t.w = source0.***c;
if (-source0)
    t = -t;
q.x = t.x. - floor(t.x) ;
q.y = t.y. - floor(t.y) ;
q.z = t.z. - floor(t.z) ;
q.w = t.w. - floor(t.w) ;
if (destination.x) R.x = q.x;
if (destination.y) R.y = q.y;
if (destination.z) R.z = q.z;
if (destination.w) R.w = q.w;
```

EXAMPLES

FRC R4.z,R3; //R4.z=R3.z-floor(R3.z)

Logarithm Base 2 (LG2)

Format

LG2[c] D[.xyzw][(CC[.xyzw])],[-]S0.[xyzw]

Description

Logarithm base2 accepts a scalar source0 of which the sign bit is ignored.

LG2(0.0) gives (-Inf,-Inf,-Inf,-Inf)

LG2(Inf) gives (+Inf,+Inf,+Inf,+Inf)

Operation

Table 8G sets forth an example of operation associated with the LG2 instruction.

TABLE 8G

```
t.x = source0.c***;           /* c is x or y or z or w */
t.y = source0.*c**;
t.z = source0.**c*;
t.w = source0.***c;
if (-source0)
    t = -t;
tmpA = exponent(t.x) ;                          /* -
128 <= tmpA < 128 */
tmpB = mantissa(t.x) ;                          /* 1.0
<= tmpB < 2.0 */
q.x = q.y = q.z = q.w = tmpA + log2(tmB);  where
|ieee_log(tmpB)/LN2-LG2(tmpB) | < 1/(2**22)
if (destination.x) R.x = q.x;
if (destination.y) R.y = q.y;
if (destination.z) R.z = q.z;
if (destination.w) R.w = q.w;
```

EXAMPLES

LG2 R4,R3.z;

Mov (MOV).

Format

MOV [c] D[.xyzw][(CC[.xyzw])],[-]S0[.xyzw]

Description

The contents of a designated source are moved into a destination.

Operation

Table 8H sets forth an example of operation associated with the MOV instruction.

TABLE 8H

```
t.x = source0.c***;           /* c is x or y or z or w */
t.y = source0.*c**;
t.z = source0.**c*;
t.w = source0.***c;
if (-source0)
    t = -t;
q.x = t.x;
q.y = t.y;
q.z = t.z;
q.w = t.w;
if (destination.x) (register ? R.x : o[OADD] .x) = q.x;
if (destination.y) (register ? R.y : o[OADD] .y) = q.y;
if (destination.z) (register ? R.z : o[OADD] .z) = q.z;
if (destination.w) (register ? R.w : o[OADD] .w) = q.w;
```

EXAMPLES

MOV o[1], -R4 (move negative R4 into o[1])

MOV R5,v[POS].w (move w component of v[POS] into xyzw components of R5)

MOV o[HPOS],c[0] (output constant in location zero)

MOV R7.xyw,R4.x (move x component of R4 into x,y,w components of R7)

Multiply (MUL)

Format

MUL[c] D[.xyzw][(CC[.xyzw])],[-]S0[.xyzw], [-]S1 [.xyzw]

Description

The present instruction multiplies sources into a destination. It should be noted that 0.0 times anything is 0.0.

Operation

Table 8I sets forth an example of operation associated with the MUL instruction.

TABLE 8I

```
t.x = source0.c***;           /* c is x or y or z or w */
t.y = source0.*c**;
t.z = source0.**c*;
t.w = source0.***c;
if (-source0)
    t = -t;
u.x = source1.c***;           /* c is x or y or z or w */
u.y = source1.*c**;
u.z = source1.**c*;
u.w = source1.***c;
if (-source1)
    u = -u;
q.x = t.x*u.x;
q.y = t.y*u.y;
q.z = t.z*u.z;
q.w = t.w*u.w;
if (destination.x) (register ? R.x : o[OADD] .x) = q.x;
if (destination.y) (register ? R.y : o[OADD] .y) = q.y;
if (destination.z) (register ? R.z : o[OADD] .z) = q.z;
if (destination.w) (register ? R.w : o[OADD] .w) = q.w;
```

EXAMPLES

MUL R6,R5,c[CON5]  R6.xyzw=R5.xyzw*c[CON5] .xyzw

MUL R6.x,R5.w, -R7  R6.x=R5.w*-R7.x

Add (ADD)

Format

ADD[c] D[.xyzw][(CC[.xyzw])], [−]S0[.xyzw], [−]S1[.xyzw]

Description

The present instruction adds sources into a destination.

Operation

Table 8J sets forth an example of operation associated with the ADD instruction.

TABLE 8J

```
t.x = source0.c***;        /* c is x or y or z or w */
t.y = source0.*c**;
t.z = source0.**c*;
t.w = source0.***c;
if (−source0)
    t = −t;
u.x = source1.c***;        /* c is x or y or z or w */
u.y = source1.*c**;
u.z = source1.**c*;
u.w = source1.***c;
if (−source1)
    u = −u;
q.x = t.x+u.x;
q.y = t.y+u.y;
q.z = t.z+u.z;
q.w = t.w+u.w;
if (destination.x) (register ? R.x : o[OADD] .x) = q.x;
if (destination.y) (register ? R.y : o[OADD] .y) = q.y;
if (destination.z) (register ? R.z : o[OADD] .z) = q.z;
if (destination.w) (register ? R.w : o[OADD] .w) = q.w;
```

EXAMPLES

ADD R6,R5.x,c[CON5]  R6.xyzw=R5.x+c[CON5].xyzw
ADD R6.x,R5,−R7  R6.x=R5.x−R7.x
ADD R6,−R5,c[CON5]  R6.xyzw=−R5.xyzw+c[CON5].xyzw Multiply And Add (MAD)

Format

MAD[c] D[.xyzw][(CC[.xyzw])],[−]S0[.xyzw],[−]S1[.xyzw], [−]S2[.xyzw]

Description

The present instruction multiplies and adds sources into a destination. It should be noted that 0.0 times anything is 0.0.

Operation

Table 8K sets forth an example of operation associated with the MAD instruction.

TABLE 8K

```
t.x = source0.c***;        /* c is x or y or z or w */
t.y = source0.*c**;
t.z = source0.**c*;
t.w = source0.***c;
if (−source0)
    t = −t;
u.x = source1.c***;        /* c is x or y or z or w */
u.y = source1.*c**;
u.z = source1.**c*;
u.w = source1.***c;
if (−source1)
    u = −u;
v.x = source2.c***;        /* c is x or y or z or w */
v.y = source2.*c**;
v.z = source2.**c*;
v.w = source2.***c;
if (−source2)
    v = −v;
q.x = t.x*u.x+v.x;
q.y = t.y*u.y+v.y;
q.z = t.z*u.z+v.z;
q.w = t.w*u.w+v.w;
```

TABLE 8K-continued

```
if (destination.x) (register ? R.x : o[OADD] .x) = q.x;
if (destination.y) (register ? R.y : o[OADD] .y) = q.y;
if (destination.z) (register ? R.z : o[OADD] .z) = q.z;
if (destination.w) (register ? R.w : O[OADD] .w) = q.w;
```

EXAMPLES

MAD R6,−R5,v[POS],−R3  R6=−R5*v[POS]−R3
MAD R6.z,R5.w,v[POS],R5  R6.z=R5.w*v[POS].z+R5.z

Reciprocal (RCP)

Format

RCP[c] D[.xyzw][(CC[.xyzw])],[−]S0.[xyzw]

Description

The present instruction inverts a source scalar into a destination. The source may have one subscript. Output may be exactly 1.0 if the input is exactly 1.0.

RCP(−Inf) gives (−0.0,−0.0,−0.0,−0.0)
RCP(−0.0) gives (−Inf,−Inf,−Inf,−Inf)
RCP(+0.0) gives (+Inf,+Inf,+Inf,+Inf)
RCP(+Inf) gives (0.0,0.0,0.0,0.0)

Operation

Table 8L sets forth an example of operation associated with the RCP instruction.

TABLE 8L

```
t.x = source0.c***;        /* c is x or y or z or w */
t.y = source0.*c**;
t.z = source0.**c*;
t.w = source0.***c;
if (−source0)
    t = −t;
if (t.x == 1.0)
    q.x = q.y = q.z = q.w = 1.0;
else
    q.x = q.y = q.z = q.w = 1.O/t.x;  where |q.x −
    IEEE(1.0/t.x) | < 1/(2**22) for all 1.0<=t.x<2.0
if (destination.x) (register ? R.x : o[OADD] .x) = q.x;
if (destination.y) (register ? R.y : o[OADD] .y) = q.y;
if (destination.z) (register ? R.z : o[OADD] .z) = q.z;
if (destination.w) (register ? R.w : o[OADD] .w) = q.w;
```

EXAMPLES

RCP R2,c[A0.x+14].x  R2.xyzw=1/c[A0.x+14].x
RCP R2.w,R3.z  R2.w=1/R3.z

Reciprocal Square Root (RSQ)

Format

RSQ[c] D[.xyzw][(CC[.xyzw])],[−]S0.[xyzw]

Description

The present instruction performs an inverse square root of absolute value on a source scalar into a destination. The source may have one subscript. The output may be exactly 1.0 if the input is exactly 1.0.

RSQ(0.0) gives (+Inf,+Inf,+Inf,+Inf)
RSQ(Inf) gives (0.0,0.0,0.0,0.0)

Operation

Table 8M sets forth an example of operation associated with the RSQ instruction.

TABLE 8M

```
t.x = source0.c***;        /* c is x or y or z or w */
t.y = source0.*c**;
t.z = source0.**c*;
t.w = source0.***c;
if (-source0)
    t = -t;
if (t.x == 1.0)
    q.x = q.y = q.z = q.w = 1.0;
else
    q.x=q.y=q.z=q.w=1.o/sqrt(abs(t.x) ) ; with |q.x -
    IEEE(1.0/sqrt(t.x) ) | < 1/(2**22) for 1.0:<=t.x<4.0
if (destination.x) (register ? R.x : o[OADD] .x) = q.x;
if (destination.y) (register ? R.y : o[OADD] .y) = q.y;
if (destination.z) (register ? R.z : o[OADD] .z) = q.z;
if (destination.w) (register ? R.w : o[OADD] .w) = q.w;
```

EXAMPLES

RSQ o[PA0],R3.y o[PA0]=1/sqrt(abs(R3.y))
RSQ R2.w,v[9].x R2.w=1/sqrt(abs(v[9].x))

Set On Equal To (SEQ)

Format

SEQ[c] D[.xyzw][(CC[.xyzw])],[-]S0[.xyzw],[-]S1[.xyzw]

Description

The present instruction set a destination to 1.0/0.0 if source0 is equal/not_equal compared to source1.

Operation

Table 8N sets forth an example of operation associated with the SEQ instruction.

TABLE 8N

```
t.x = source0.c***;        /* c is x or y or z or w */
t.y = source0.*c**;
t.z = source0.**c*;
t.w = source0.***c;
if (-source0)
    t = -t;
u.x = source1.c***;        /* c is x or y or z or w */
u.y = source1.*c**;
u.z = source1.**c*;
u.w = source1.***c;
if (-source1)
    u = -t;
q.x = (t.x == u.x) ? 1.0 : 0.0;
q.y = (t.y == u.y) ? 1.0 : 0.0;
q.z =](t.z == u.z) ? 1.0 : 0.0;
q.w = (t.w == u.w) ? 1.0 : 0.0;
if (destination.x) R.x = q.x;
if (destination.y) R.y = q.y;
if (destination.z) R.z = q.z;
if (destination.w) R.w = q.w:
```

EXAMPLES

SEQ R4,R3,R7;    //R4.xyzw=(R3.xyzw=R7.xyzw?1.0:0.0)

Set False (SFL)

Format

SFL[c] D[.xyzw][(CC[.xyzw])],[-]S0[.xyzw],[-]S1[.xyzw]

DESCRIPTION

The present instruction set the destination to 0.0.

Operation

Table 8O sets forth an example of operation associated with the SFL instruction.

TABLE 8O

```
t.x = source0.c***;        /* c is x or y or z or w */
t.y = source0.*c**;
t.z = source0.**c*;
t.w = source0.***c;
if (-source0)
    t = -t;
u.x = source1.c***;        /* c is x or y or z or w */
u.y = source1.*c**;
u.z = source1.**c*;
u.w = source1.***c;
if (-source1)
    u = -u;
q.x = 0.0;
q.y = 0.0;
q.z = 0.0;
q.w = 0.0;
if (destination.x) R.x = q.x;
if (destination.y) R.y = q.y;
if (destination.z) R.z = q.z;
if (destination.w) R.w = q.w;
```

EXAMPLES

SFL R4,R3,R7; //R4.xyzw=0.0,0.0,0.0,0.0

Set On Greater Than (SGT)

Format

SGT[c] D[.xyzw][(CC[.xyzw])],[-]S0[.xyzw],[-]S1[.xyzw]

Description

The present instruction sets the destination to 1.0/0.0 if source0 is greater/less_or_equal compared to source1.

Operation

Table 8P sets forth an example of operation associated with the SGT instruction.

TABLE 8P

```
t.x = source0.c***;    /* c is x or y or z or w */
t.y = source0.*c**;
t.z = source0.**c*;
t.w = source0.***c;
if (-source0)
    t = -t;
u.x = source1.c***;    /* c is x or y or z or w */
u.y = source1.*c**;
u.z = source1.**c*;
u.w = source1.***c;
if (-source1)
    u = -u;
q.x = (t.x > u.x) ? 1.0 : 0.0;
q.y = (t.y > u.y) ? 1.0 : 0.0;
q.z = (t.z > u.z) ? 1.0 : 0.0;
q.w = (t.w > u.w) ? 1.0 : 0.0;
if (destination.x) R.x = q.x;
if (destination.y) R.y = q.y;
if (destination.z) R.z = q.z;
if (destination.w) R.w = q.w;
```

EXAMPLES

SGT R4,R3,R7; //R4.xyzw=(R3.xyzw>R7.xyzw?1.0:0.0)

Sine (SIN)

Format

SIN[c] D[.xyzw][(CC[.xyzw])],[-]S0.[xyzw]

Description

The present instruction is a sine function. The source is a scalar. Input is an unbounded angle in radians.

Operation

Table 8Q sets forth an example of operation associated with the SIN instruction.

TABLE 8Q

```
t.x = source0.c***;      /* c is x or y or z or w */
t.y = source0.*c**;
t.z = source0.**c*;
t.w = source0.***c;
if (-source0)
    t = -t;
q.x = q.y = q.z = q.w = SIN(t.x);    where
|ieee_sin(t.x)-SIN(t.x) | < 1/(2**22)  for 0.0 <= t.x <
2PI
if (destination.x) R.x = q.x;
if (destination.y) R.y = q.y;
if (destination.z) R.z = q.z;
if (destination.w) R.w = q.w;
```

EXAMPLES

SIN R0,R3.x;

Set On Less Than Or Equal (SLE)

Format

SLE[c] D[.xyzw][(CC[.xyzw])],[-]S0[.xyzw],[-]S1[.xyzw]

Description

The present instruction sets the destination to 1.0/0.0 if source0 is less_or_equal/greater compared to source1.

Operation

Table 8S sets forth an example of operation associated with the SLE instruction.

TABLE 8S

```
t.x = source0.c***;      /* c is x or y or z or w */
t.y = source0.*c**;
t.z = source0.**c*;
t.w = source0.***c;
if (-source0)
    t = -t;
u.x = source1.c***;      /* c is x or y or z or w */
u.y = source1.*c**;
u.z = source1.**c*;
u.w = source1.***c;
if (-source1)
    u = -u;
q.x = (t.x <= u.x) ? 1.0 : 0.0;
q.y = (t.y <= u.y) ? 1.0 : 0.0;
q.z = (t.z <= u.z) ? 1.0 : 0.0;
q.w = (t.w <= u.w) ? 1.0 : 0.0;
if (destination.x) R.x = q.x;
if (destination.y) R.y = q.y;
if (destination.z) R.z = q.z;
if (destination.w) R.w = q.w;
```

EXAMPLES

SLE R4,R3,R7;  //R4.xyzw=(R3.xyzw<=R7.xyzw?1.0:0.0)

Three Component Dot Product (DP3)

Format

DP3[c] D[.xyzw][(CC[.xyzw])],[-]S0[.xyzw],[-]S1[.xyzw]

Description

The present instruction performs a three component dot product of the sources into a destination. It should be noted that 0.0 times anything is 0.0.

Operation

Table 8T sets forth an example of operation associated with the DP3 instruction.

TABLE 8T

```
t.x = source0.c***;      /* c is x or y or z or w */
t.y = source0.*c**;
t.z = source0.**c*;
t.w = source0.***c;
if (-source0)
    t = -t;
u.x = source1.c***;      /* c is x or y or z or w */
u.y = source1.*c**;
u.z = source1.**c*;
u.w = source1.***c;
if (-source1)
    u = -u;
q.x = q.y = q.z = q.w = t.x*u.x + t.y*u.y + t.z*u.z;
if (destination.x) (register ? R.x : o[OADD] .x) = q.x;
if (destination.y) (register ? R.y : o[OADD] .y) = q.y;
if (destination.z) (register ? R.z : o[OADD] .z) = q.z;
if (destination.w) (register ? R.w : o[OADD] .w) = q.w;
```

EXAMPLES

DP3 R6,R3,R4  R6.xyzw=R3.x*R4.x+R3.y*R4.y+R3.z*R4.z

DP3 R6.w,R3,R4  R6.w=R3.x*R4.x+R3.y*R4.y+R3.z*R4.z

Four Component Dot Product (DP4)

Format

DP4[c] D[.xyzw][(CC[.xyzw])],[-]S0[.xyzw],[-]S1[.xyzw]

Description

The present instruction performs a four component dot product of the sources into a destination. It should be noted that 0.0 times anything is 0.0.

Operation

Table 8U sets forth an example of operation associated with the DP4 instruction.

TABLE 8U

```
t.x = source0.c***;      /* c is x or y or z or w */
t.y = source0.*c**;
t.z = source0.**c*;
t.w = source0.***c;
if (-source0)
    t = -t;
u.x = source1.c***;      /* c is x or y or z or w */
u.y = source1.*c**;
u.z = source1.**c*;
u.w = source1.***c;
if (-source1)
    u = -u;
q.x = q.y = q.z = q.w - t.x*u.x + t.y*u.y + t.z*u.z + t.w*u.w;
if (destination.x) (register ? R.x : o[OADD] .x) = q.x;
if (destination.y) (register ? R.y : o[OADD] .y) = q.y;
if (destination.z) (register ? R.z : o[OADD] .z) = q.z;
if (destination.w) (register ? R.w : o[OADD] .w) = q.w;
```

EXAMPLES

DP4 R6,v[POS],c[MV0]  R6.xyzw=v.x*c.x+v.y*c.y+v.z*c.z+v.w*c.w

DP4 R6.xw,v[POS].w,R3  R6.xw=v.w*R3.x+v.w*R3.y+v.w*R3.z+v.w*R3.w

Distance Vector (DST)

Format

DST[c] D[.xyzw][(CC[.xyzw])],[-]S0[.xyzw],[-]S1[.xyzw]

Description

The present instruction calculates a distance vector. A first source vector is assumed to be (NA,d*d,d*d,NA) and a second source vector is assumed to be (NA,1/d,NA,1/d). A destination vector is then outputted in the form of (1,d,d*d, 1/d). It should be noted that 0.0 times anything is 0.0.

Operation

Table 8V sets forth an example of operation associated with the DST instruction.

TABLE 8V

| | |
|---|---|
| t.x = source0.c***; | /* c is x or y or z or w */ |
| t.y = source0.*c**; | |
| t.z = source0.**c*; | |
| t.w = source0.***c; | |
| if (−source0) | |
|    t = −t; | |
| u.x = source1.c***; | /* c is x or y or z or w */ |
| u.y = source1.*c**; | |
| u.z = source1.**c*; | |
| u.w = source1.***c; | |
| if (−source1) | |
|    u = −u; | |
| q.x = 1.0; | |
| q.y = t.y*u.y; | |
| q.z = t.z; | |
| q.w = u.w; | |
| if (destination.x) | (register ? R.x : o[OADD].x) = q.x; |
| if (destination.y) | (register ? R.y : o[OADD].y) = q.y; |
| if (destination.z) | (register ? R.z : o[OADD].z) = q.z; |
| if (destination.w) | (register ? R.w : o[OADD].w) = q.w; |

EXAMPLES

DST R2,R3,R4 R2.xyzw=(1.0,R3.y*R4.y,R3.z,R4.w)

Minimum (MIN)

Format

MIN[c] D[.xyzw][(CC[.xyzw])],[−]S0[.xyzw],[−]S1[.xyzw]

Description

The present instruction determines a minimum of sources, and moves the same into a destination.

Operation

Table 8W sets forth an example of operation associated with the MIN instruction.

TABLE 8W

| | |
|---|---|
| t.x = source0.c***; | /* c is x or y or z or w */ |
| t.y = source0.*c**; | |
| t.z = source0.**c*; | |
| t.w = source0.***c; | |
| if (−source0) | |
|    t = −t; | |
| u.x = source1.c***; | /* c is x or y or z or w */ |
| u.y = source1.*c**; | |
| u.z = source1.**c*; | |
| u.w = source1.***c; | |
| if (−source1) | |
|    u = −u; | |
| q.x = (t.x < u.x) ? t.x : u.x; | |
| q.y = (t.y < u.y) ? t.y : u.y; | |
| q.z = (t.z < u.z) ? t.z : u.z; | |
| q.w = (t.w < u.w) ? t.w : u.w; | |
| if (destination.x) | (register ? R.x : o[OADD].x) = q.x; |
| if (destination.y) | (register ? R.y : o[OADD].y) = q.y; |
| if (destination.z) | (register ? R.z : o[OADD].z) = q.z; |
| if (destination.w) | (register ? R.w : o[OADD].w) = q.w; |

EXAMPLES

MIN R2,R3,R4 R2=component min(R3,R4)

MIN R2.x,R3.z, R4 R2.x=(R3.z,R4.x)

Maximum (MAX)

Format

MAX[c] D[.xyzw][(CC[.xyzw])],[−]S0[.xyzw],[−]S1[.xyzw]

DESCRIPTION

The present instruction determines a maximum of sources, and moves the same into a destination.

Operation

Table 8X sets forth an example of operation associated with the MAX instruction.

TABLE 8X

| | |
|---|---|
| t.x = source0.c***; | /* c is x or y or z or w */ |
| t.y = source0.*c**; | |
| t.z = source0.**c*; | |
| t.w = source0.***c; | |
| if (−source0) | |
|    t = −t; | |
| u.x = source1.c***; | /* c is x or y or z or w */ |
| u.y = source1.*c**; | |
| u.z = source1.**c*; | |
| u.w = source1.***c; | |
| if (−source1) | |
|    u = −u; | |
| q.x = (t.x >= u.x) ? t.x : u.x; | |
| q.y = (t.y >= u.y) ? t.y : u.y; | |
| q.z = (t.z >= u.z) ? t.z : u.z; | |
| q.w = (t.w >= u.w) ? t.w : u.w; | |
| if (destination.x) | (register ? R.x : o[OADD].x) = q.x; |
| if (destination.y) | (register ? R.y : o[OADD].y) = q.y; |
| if (destination.z) | (register ? R.z : o[OADD].z) = q.z; |
| if (destination.w) | (register ? R.w : o[OADD].w) = q.w; |

EXAMPLES

MAX R2,R3,R4 R2=component max(R3,R4)

MAX R2.w,R3.x,R4 R2.w=max(R3.x,R4.w)

Set On Less Than (SLI)

Format

SLT[c] D[.xyzw][(CC[.xyzw])],[−]S0[.xyzw],[−]S1[.xyzw]

Description

The present instruction sets a destination to 1.0/0.0 if source0 is less_than/greater_or_equal to source1. The following relationships should be noted:

SetEQ R0,R1=(SGE R0,R1)*(SGE−R0,−R1)

SetNE R0,R1=(SLT R0,R1)+(SLT−R0,−R1)

SetLE R0,R1=SGE−R0,−R1

SetGT R0,R1=SLT−R0,−R1

Operation

Table 8Y sets forth an example of operation associated with the SLT instruction.

TABLE 8Y

| | |
|---|---|
| t.x = source0.c***; | /* c is x or y or z or w */ |
| t.y = source0.*c**; | |
| t.z = source0.**c*; | |
| t.w = source0.***c; | |
| if (−source0) | |
|    t = −t; | |
| u.x = source1.c***; | /* c is x or y or z or w */ |
| u.y = source1.*c**; | |
| u.z = source1.**c*; | |
| u.w = source1.***c; | |
| if (−source1) | |
|    u = −u; | |
| q.x = (t.x < u.x) ? 1.0 : 0.0; | |
| q.y = (t.y < u.y) ? 1.0 : 0.0; | |
| q.z = (t.z < u.z) ? 1.0 : 0.0; | |

TABLE 8Y-continued

```
q.w = (t.w < u.w) ? 1.0 : 0.0;
if (destination.x) R.x = q.x;
if (destination.y) R.y = q.y;
if (destination.z) R.z = q.z;
if (destination.w) R.w = q.w;
```

EXAMPLES

SLT R4,R3,R7 R4.xyzw=(R3.xyzw<R7.xyzw?1.0:0.0)

SLT R3.xz,R6.w,R4 R3.xz=(R6.w<R4.xyzw?1.0:0.0)

Set On Greater Or Equal Than (SGE)

Format

SGE[c] D[.xyzw][(CC[.xyzw])],[−]S0[.xyzw],[−]S1[.xyzw]

Description

The present instruction set a destination to 1.0/0.0 if source0 is greater_or_equal/less_than source1.

Operation

Table 8Z sets forth an example of operation associated with the SGE instruction.

TABLE 8Z

```
t.x = source0.c***;          /* c is x or y or z or w */
t.y = source0.*c**;
t.z = source0.**c*;
t.w = source0.***c;
if (−source0)
    t = −t;
u.x = source1.c***;          /* c is x or y or z or w */
u.y = source1.*c**;
u.z = source1.**c*;
u.w = source1.***c;
if (−source1)
    u = −u;
q.x = (t.x >= u.x) ? 1.0 : 0.0;
q.y = (t.y >= u.y) ? 1.0 : 0.0;
q.z = (t.z >= u.z) ? 1.0 : 0.0;
q.w = (t.w >= u.w) ? 1.0 : 0.0;
if (destination.x) R.x = q.x;
if (destination.y) R.y = q.y;
if (destination.z) R.z = q.z;
if (destination.w) R.w = q.w;
```

EXAMPLES

SGE R4,R3,R7 R4.xyzw=(R3.xyzw>=R7.xyzw?1.0:0.0)

SGE R3.xz,R6.w,R4 R3.xz=(R6.w>=R4.xyzw?1.0:0.0)

Exponential Base 2 (EXP)

Format

EXP[c] D[.xyzw][(CC[.xyzw])],[−]S0[xyzw]

Description

The present instruction performs an exponential base 2 partial support. It generates an approximate answer in dest.z and allows for a more accurate answer of dest.x*FUNC(dest.y) where FUNC is some user approximation to $2^{**}$dest.y (0.0<=dest.y<1.0). It also accepts a scalar source0. It should be noted that reduced precision arithmetic is acceptable in evaluating dest.z.

EXP(−Inf) or underflow gives (0.0,0.0,0.0,1.0)

EXP(+Inf) or overflow gives (+Inf, 0.0,+Inf,1.0)

Operation

Table 8AA sets forth an example of operation associated with the EXP instruction.

TABLE 8AA

```
t.x = source0.c***;              /* c is x or y or z or w */
t.y = source0.*c**;
t.z = source0.**c*;
t.w = source0.***c;
if (−source0)
    t = −t;
q.x = 2**TruncateTo−Infinity(t.x);
q.y = t.x − TruncateTo−Infinity   (t.x);
q.z = q.x * APPX(q.y);        where
|ieee_exp(q.y*LN2)−APPX(q.y) |   < 1/(2**11) for all
0<=q.y<1.0
q.w = 1.0;
if (destination.x)               (register ? R.x : o[OADD].x) = q.x;
if (destination.y)               (register ? R.y : o[OADD].y) = q.y;
if (destination.z)               (register ? R.z : o[OADD].z) = q.z;
if (destination.w)               (register ? R.w : o[OADD].w) = q.w;
```

EXAMPLES

EXP R4,R3.z

Logarithm Base 2 (LOG)

Format

LOG[c] D[.xyzw][(CC[.xyzw])],[−]S0.[xyzw]

Description

The present instruction performs a logarithm base 2 partial support. It generates an approximate answer in dest.z and allows for a more accurate answer of dest.x+FUNC(dest.y) where FUNC is some user approximation of log2 (dest.y) (1.0<=dest.y<2.0). It also accepts a scalar source0 of which the sign bit is ignored. Reduced precision arithmetic is acceptable in evaluating dest.z.

LOG(0.0) gives (−Inf,1.0,−Inf,1.0)

LOG(Inf) gives (Inf,1.0,Inf,1.0)

Operation

Table 8BB sets forth an example of operation associated with the LOG instruction.

TABLE 8BB

```
t.x = source0.c***;              /* c is x or y or z or w */
t.y = source0.*c**;
t.z = source0.**c*;
t.w = source0.***c;
if (−source0)
    t = −t;
if (abs(t.x) != 0.0) {
    q.x = exponent(t.x)          (−128.0 <= e < 127)
    q.y = mantissa(t.x)          (1.0 <= m < 2.0)
    q.z = q.x + APPX(q.y)        where
    |ieee_log(q.y)/LN2−APPX      (q.y) | < 1/(2**11) for
    1.0<=q.y<2.0
    q.w = 1.0;
}
else {
    q.x = −inf; q.y = 1.0;       q.z = −inf; q.w = 1.0;
}
if (destination.x)               (register ? R.x : o[OADD].x) = q.x;
if (destination.y)               (register ? R.y : o[OADD].y) = q.y;
if (destination.z)               (register ? R.z : o[OADD].z) = q.z;
if (destination.w)               (register ? R.w : o[OADD].w) = q.w;
```

EXAMPLES

LOG R4,R3.z

Light Coefficients (LT)

Format

LIT[c] D[.xyzw][(CC[.xyzw])],[−]S0[.xyzw]

Description

The present instruction provides lighting partial support. It calculates lighting coefficients from two dot products and a power (which gets clamped to −128.0<power<128.0). The source vector is:

Source0.x=n*l (unit normal and light vectors)
Source0.y=n*h (unit normal and halfangle vectors)
Source0.z is unused
Source0.w=power Reduced precision arithmetic is acceptable in evaluating dest.z. Allowed error is equivalent to a power function combining the LOG and EXP instructions (EXP(w*LOG (y))). An implementation may support at least 8 fraction bits in the power. Note that since 0.0 times anything may be 0.0, taking any base to the power of 0.0 will yield 1.0.

Operation

Table 8CC sets forth an example of operation associated with the LIT instruction.

TABLE 8CC

| | |
|---|---|
| t.x = source0.c***; | /* c is x or y or z or w */ |
| t.y = source0.*c**; | |
| t.z = source0.**c*; | |
| t.w = source0.***c; | |
| if (−source0) | |
|   t = −t; | |
| if (t.w < −127.9961) | t.w = −127.9961; /* assuming power is s8.8 */ |
| else if (t.w > 127.9961) | t.w = 127.9961; |
| if (t.x < 0.0) t.x = 0.0; | |
| if (t.y < 0.0) t.y = 0.0; | |
| q.x = 1.0; | |
| /* ambient */ | |
| q.y = t.x; | |
| /* diffuse */ | |
| q.z = (t.x > 0.0 ? EXP(t.w*LOG | (t.y)) : 0.0); |
| /* specular */ | |
| q.w = 1.0; | |
| if (destination.x) | (register ? R.x : o[OADD].x) = q.x; |
| if (destination.y) | (register ? R.y : o[OADD].y) = q.y; |
| if (destination.z) | (register ? R.z : o[OADD].z) = q.z; |
| if (destination.w) | (register ? R.w : o[OADD].w) = q.w; |

EXAMPLES

LIT R4,R3

Set On Not Equal To (SNE)

Format

SNE[c] D[.xyzw][(CC[.xyzw])],[−]S0[.xyzw],[−]S1 [.xyzw]

Description

The present instruction sets the destination to 1.0/0.0 if source0 is not_equal/equal compared to source1.

Operation

Table 8DD sets forth an example of operation associated with the SNE instruction.

TABLE 8DD

| | |
|---|---|
| t.x = source0.c***; | /* c is x or y or z or w */ |
| t.y = source0.*c**; | |
| t.z = source0.**c*; | |
| t.w = source0.***c; | |
| if (−source0) | |
|   t = −t; | |
| u.x = source1.c***; | /* c is x or y or z or w */ |
| u.y = source1.*c**; | |
| u.z = source1.**c*; | |
| u.w = source1.***c; | |
| if (−source1) | |
|   u = −u; | |
| q.x = (t.x != u.x) ? 1.0 : 0.0; | |
| q.y = (t.y != u.y) ? 1.0 : 0.0; | |

TABLE 8DD-continued

| |
|---|
| q.z = (t.z != u.z) ? 1.0 : 0.0; |
| q.w = (t.w != u.w) ? 1.0 : 0.0; |
| if (destination.x) R.x = q.x; |
| if (destination.y) R.y = q.y; |
| if (destination.z) R.z = q.z; |
| if (destination.w) R.w = q.w; |

EXAMPLES

SNE R4,R3,R7;   //R4.xyzw=(R3.xyzw !=R7.xyzw?1.0:0.0)

Set True (STR)

Format

STR[c] D[.xyzw][(CC[.xyzw])], [−]S0[.xyzw],[−]S1 [.xyzw]

Description

The present instruction sets the destination to 1.0.

Operation

Table 8EE sets forth an example of operation associated with the STR instruction.

TABLE 8EE

| | |
|---|---|
| t.x = source0.c***; | /* c is x or y or z or w */ |
| t.y = source0.*c**; | |
| t.z = source0.**c*; | |
| t.w = source0.***c; | |
| if (−source0) | |
|   t = −t; | |
| u.x = source1.c***; | /* c is x or y or z or w */ |
| u.y = source1.*c**; | |
| u.z = source1.**c*; | |
| u.w = source1.***c; | |
| if (−source1) | |
|   u = −u; | |
| q.x = 1.0; | |
| q.y = 1.0; | |
| q.z = 1.0; | |
| q.w = 1.0; | |
| if (destination.x) R.x = q.x; | |
| if (destination.y) R.y = q.y; | |
| if (destination.z) R.z = q.z; | |
| if (destination.w) R.w = q.w; | |

EXAMPLES

STR R4,R3,R7; //R4.xyzw=1.0,1.0,1.0,1.0

Floating Point Requirements

All calculations may be assumed to be IEEE single precision floating point with a format of s1e8 m23, and an exponent bias of 127. No floating point exceptions or interrupts may be supported. Denorms may be flushed to zero. NaN may be treated as infinity. Negative 0.0 may be treated as positive 0.0 in all comparisons.

The following rules of Table 8FF may apply.

TABLE 8FF

| | |
|---|---|
| 0.0 * x = 0.0 | for all x (including infinity) |
| 1.0 * x = x | for all x (including infinity and NaN) |
| 0.0 + x = x | for all x (including infinity and NaN) |

Programming Examples

A plurality of program examples will now be set forth in Table 9.

TABLE 9

The #define statements are meant for a cpp run.

Example 1

```
%!VS2.0
; Absolute Value R4 = abs(R0)
    MAX R4,R0,-R0;
```

Example 2

```
%!VS2.0
; Cross product | i    j    k  | into R2
;               |R0.x R0.y R0.z|
;               |R1.x R1.y R1.z|
    MUL R2, R0.zxyw,R1.yzxw;
    MAD R2, R0.yzxw,R1.zxyw, -R2;
```

Example 3

```
%!VS2.0
; Determinant |R0.x R0.y R0.z| into R3
;             |R1.x R1.y R1.z|
;             |R2.x R2.y R2.z|
    MUL R3,R1.zxyw,R2.yzxw;
    MAD R3,R1.yzxw,R2.zxyw,-R3;
    DP3 R3,R0,R3;
```

Example 4

```
%!VS2.0
; R2 = matrix[3][3] *v->onrm ,normalize and calculate
distance vector R3
#define INRM 11; source normal
#define N0    16; inverse transpose modelview row 0
#define N4    17; inverse transpose modelview row 1
#define N8    18; inverse transpose modelview row 2
    DP3 R2.x,v[INRM],c[N0];
    DP3 R2.y,v[INRM],c[N4];
    DP3 R2.z,v[INRM],c[N8];
    DP3 R2.w,R2,R2;
    RSQ R11.x,R2.w;
    MUL R2.xyz,R2,R11.x;
    DST R3,R2.w,R11.x;
```

Example 5

```
%!VS2.0
; reduce R1 to fundamental period
#define PERIOD 70;   location PERIOD is
1.0/(2*PI),2*PI,0.0,0.0
    MUL R0,R1,c[PERIOD].x;   divide by period
    FRC R4,R0;
    MUL R2,R4.x,c[PERIOD].y;    multiply by period
```

Example 6

```
%!VS2.0
; matrix[4][4]*v->opos with homogeneous divide
#define IPOS    0;    source position
#define M0    20;    modelview row 0
#define M4    21;    modelview row 1
#define M8    22;    modelview row 2
#define M12   23;    modelview row 3
    DP4 R5.w,v[IPOS],c[M12];
    DP4 R5.x,v[IPOS],c[M0];
    DP4 R5.y,v[IPOS],c[M4];
    DP4 R5.z,v[IPOS],c[M8];
    RCP R11,R5.w;
    MUL R5,R5,R11;
```

Example 7

```
%!VS2.0
; R4 = v->weight.x*R2 + (1.0-v->weight.x)*R3
#define IWGT 11;    source weight
    ADD R4,R2,-R3;
    MAD R4,v[IWGT].x,R4,R3;
```

Example 8

```
%!VS2.0
; signum function R6 = R3.x>0? 1, R3.x==0? 0, R3.x<0? -1
; c[0] = (0.0,1.0,NA,NA)
    MOVc CC,R3.x;
    SGT R6,R3.x,c[0].x;
    MOV R6(LT),-c[0].y;
```

TABLE 9-continued

The #define statements are meant for a cpp run.

Example 9

```
%!VS2.0
; subroutine call to index v[TEX3].x if v[TEX3].y > 0.0
    MOVc CC.y,v[TEX3].y;
    ARL A0.w,v[TEX3].x;
    CAL GT.y,A0.w;
```

As mentioned earlier, various functions such as sine and cosine may be executed by the previous embodiment. In particular, such mathematical functions are directly performed on the input data. It should be noted that the mathematical function is directly performed in the computer graphics pipeline without a texture look-up or significant or any aid from a central processing unit. More information will now be set forth regarding the manner in which one embodiment of the present invention is capable of directly executing such functions in a computer graphics pipeline such as that of FIG. 1.

Figure 6:
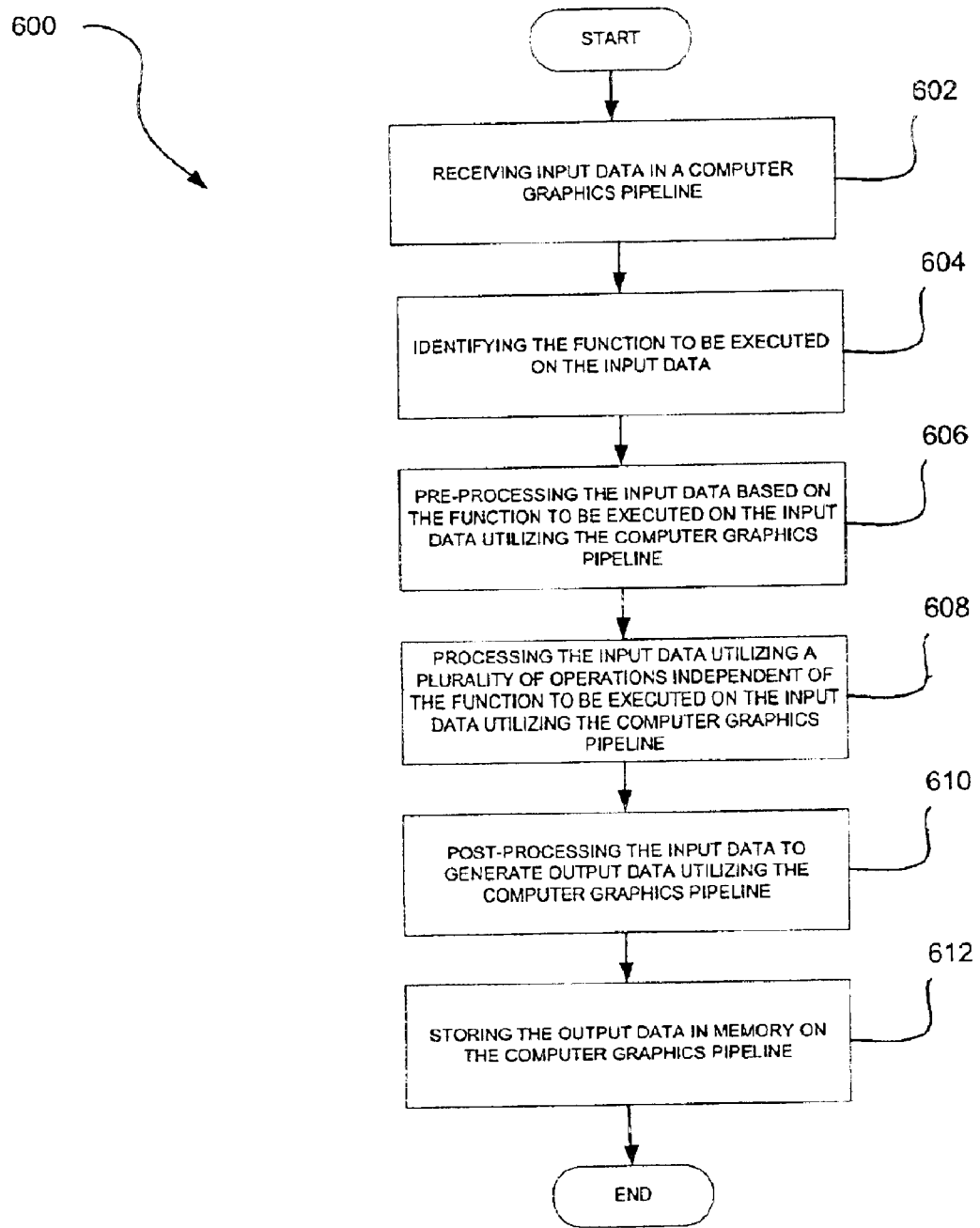
FIG. 6 illustrates a method for directly executing a function in a computer graphics pipeline.

FIG. 6 illustrates a method 600 for directly executing a function in a computer graphics pipeline. While the present method 600 may be carried in the context of the computer graphics pipeline of FIG. 1 and more particularly the functional module 302 of FIG. 3, it should be noted that any other type of dedicated graphics pipeline-application specific integrated circuit (ASIC) may be utilized per the desires of the user. Moreover, the method 600 need not be limited to a graphics pipeline. It can work just as well outside of the context of graphics.)

Initially, in operation 602, input data is received in a computer graphics pipeline. Such input data may include vertex data or any other data capable of being handled by the computer graphics pipeline.

Next, in operation 604, the particular function to be executed on the input data is identified. In one embodiment, the mathematical function may include a sine, cosine, or various other functions including, but not be limited to tangent, arctangent, exponentiation, logarithm, hyperbolic sine, hyperbolic cosine, hyperbolic tangent, and/or hyperbolic arctangent. Moreover, the input data may be in a floating-point format. It should be noted that the sin(x) and cos(x) functions may include an argument x that is in either degrees or radians.

Thus, in operation 606, pre-processing of the input data may be carried out based on the function to be executed on the input data utilizing the computer graphics pipeline. The purpose of the pre-processing is to convert the input data into a form that may be handled by general processing hardware that is used later, regardless of the specific function to be utilized. More information regarding the pre-processing of operation 606 will be set forth in greater detail during reference to FIG. 7.

Thereafter, in operation 608, the input data may be processed utilizing a plurality of operations independent of the function to be executed on the input data utilizing the computer graphics pipeline. As an option, the mathematical function may be performed utilizing a Taylor Series, a cordic algorithm, or any other type of algorithm. Still yet, the input data may be converted from a first coordinate system to a second coordinate system (e.g., Cartesian, cylindrical, spherical, etc.). Further, the mathematical function maybe carried out in one cycle in the computer graphics pipeline. More information regarding the processing of operation 608 will be set forth in greater detail during reference to FIG. 8.

Subsequently, in operation 610, post-processing may be carried out on the input data to generate output data utilizing the computer graphics pipeline. The purpose of the post-processing is to convert the general output of the general processing hardware to a form that may be handled by subsequent processes. More information regarding the post-processing of operation 610 will be set forth in greater detail during reference to FIG. 9.

Finally, such output data may be stored in memory on the computer graphics pipeline. Note operation 612. Of course, such memory may include, but is not limited to any type of buffer memory or the like for storing the output for later use.

It should be noted that the mathematical function is directly performed in the computer graphics pipeline. In other words, the pre-processing of operation 606, the processing of operation 608, and the post-processing of operation 610 are performed by the computer graphics pipeline, without a texture look-up or significant or any aid from a central processing unit.

Figure 7:
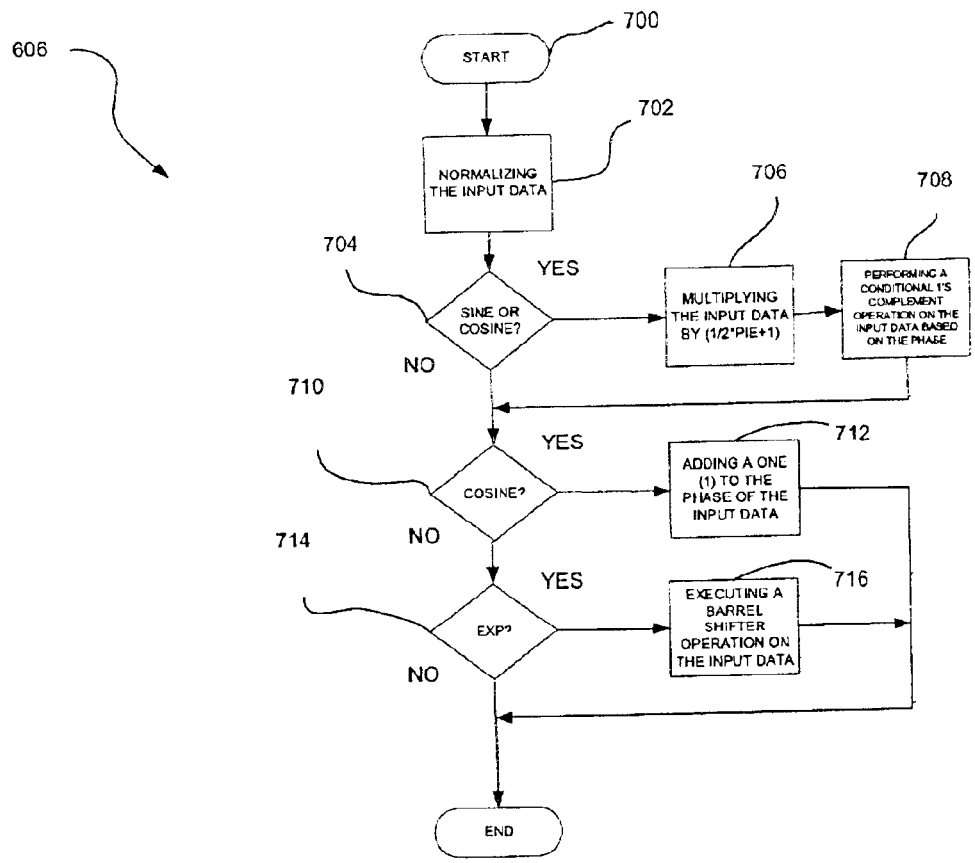
FIG. 7 illustrates a method for pre-processing input data, in accordance with the process of FIG. 6.

FIG. 7 illustrates a method 700 for pre-processing input data, in accordance with operation 606 of FIG. 6. While specific pre-processing is set forth herein, it should be noted that the preprocessing may include any operations capable of converting the input data into a form that may be handled by general processing hardware that is used in operation 608.

As shown, the input data is initially normalized in operation 702. As an option, such normalization includes altering the input data by a scaling bias. Next, various pre-processing is carried out based on the type of function that is to be executed.

In particular, it is determined in decision 704 whether the function is sine or cosine. If so, the pre-processing includes multiplying the input data by $(1/(2\pi)+1.0)$. See operation 706. This ensures that the range of input data of $[0.0, 2.0\pi)$ is mapped to a range of $[1.0, 2.0)$. If the input data resides outside of the range of $[0.0, 2.0\pi)$, the integer portion of the input data may be ignored. As an option, the sign of the input data may be manipulated to position the input data in the appropriate quadrant. It should be understood that operation 706 may be executed with a precision high enough to permit an indication of the appropriate quadrant of the input data while retaining intra-quadrant accuracy.

Moreover, the pre-processing includes performing a conditional 1's complement operation on the input data. Note operation 708. In particular, the conditional 1's complement operation is conditioned on quadrant of the input. The purpose of such pre-processing is to exploit the symmetry of the sine and cosine functions and thus transform the general problem to that of always evaluating the function within a single quadrant.

It is then determined in decision 710 whether the function to be executed is a cosine. If so, the pre-processing includes adding a one (1) to the quadrant of the input data in operation 712. The purpose of such pre-processing is to alter the quadrant of the input data so that it may be processed as if it were the subject of a sine function. Such operation as that of 712 is an optimization in the preferred embodiment.

Next, it is determined in decision 714 whether the function to be executed is exponentiation. If the function includes exponentiation, a barrel shift operation is performed on the input data. See operation 716. The purpose of such pre-processing is to denormalize the input into an integer and fractional portion, the fractional portion then serving as input to 608.

Figure 8:
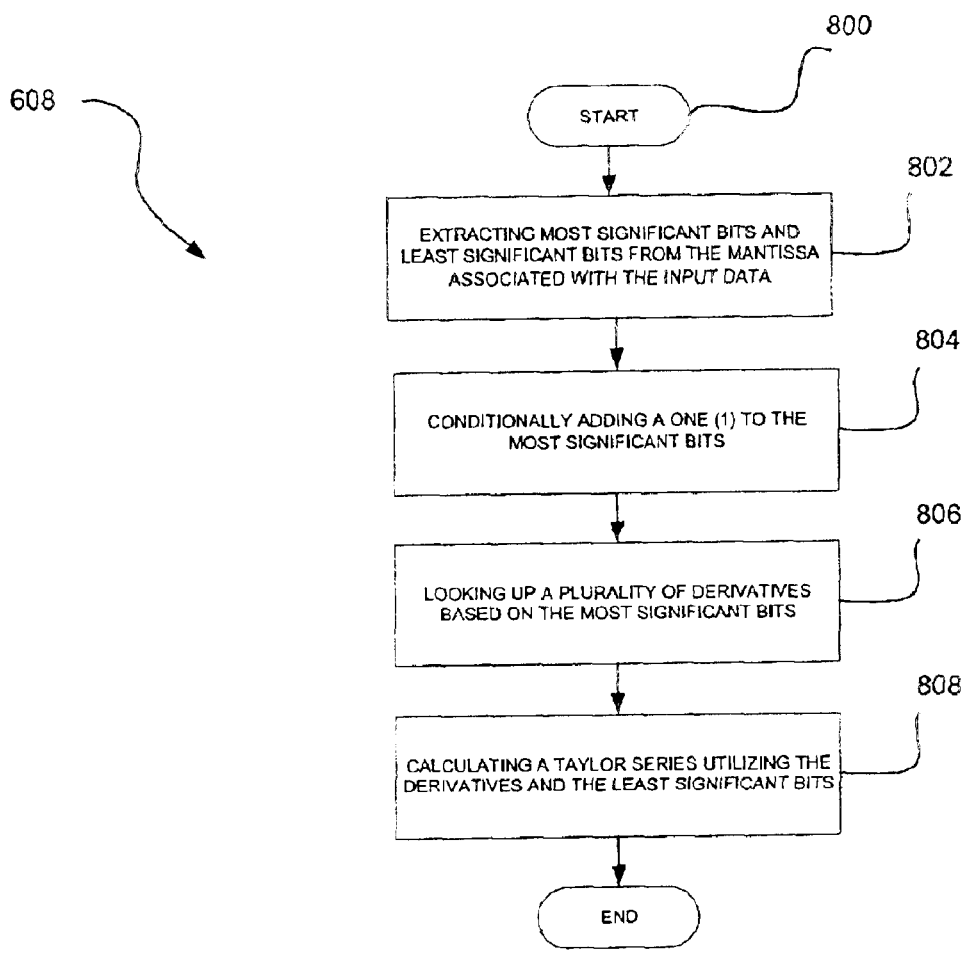
FIG. 8 illustrates a method for processing input data, in accordance with the process of FIG. 6.

FIG. 8 illustrates a method 800 for processing input data, in accordance with operation 608 of FIG. 6. While specific processing is set forth herein, it should be noted that the processing may include any algorithm capable of executing the function in accordance with operation 608.

Initially, in operation 802, the processing may include extracting a set of most significant bits (msbs) and a set of least significant bits (lsbs) from a mantissa associated with the input data. It should be noted that the mantissa may be extracted as a component of the input data along with a sign and an exponent thereof. In one embodiment, the set of most significant bits may include a 6-bit set. Further, the set of least significant bits may include a 17-bit set. It should be noted that the number of least and most significant bits determines an accuracy of the output data, and further has ramifications in the contents of the tables.

Further, in operation 804, the processing may include conditionally adding a one (1) to the most significant bits. In particular, the addition operation is conditioned on the msb of the lsb set. In the embodiment of the previous paragraph, the corresponds to the msb of the 17-bit lsb set. The purpose of the addition operation is to best utilize the table entries by always accessing the table entry closest (absolute value) to the exact desired sample location.

As mentioned earlier, the processing may include calculating a Taylor Series. To accomplish this calculation, information is looked up in a plurality of tables in operation 806 corresponding to the most significant bits extracted in operation 802 as processed by 804 Such retrieved information may include a first n (n=0, 1, 2) derivatives corresponding to the most significant bits. As an option, the look-up operation may be based at least in part on the least significant bits in order to locate a closest table entry. In the alternative, larger tables may be utilized.

The first n (i.e. n=2) derivatives may then be summed in the Taylor Series utilizing the least significant bits extracted in operation 802, the calculation of which is conventionally known. Table GG illustrates the various derivatives, least significant bits, and the equation by which the Taylor Series is calculated. It should be noted that the sign extracted in operation 802 may also be used during the following calculations.

TABLE GG $f_0 = f(x)$
$f_1 = f'(x)$
$f_2 = f''(x)$
$h = \text{lsbs}$
$\text{sum} = f_0 + h/1!* f_1 + h^2/2!* f_2 + h^2/2!* f_2$ As an option, the tables may be utilized based on the function to be executed on the input data. Moreover, the tables may be hard-coded or stored in random access memory for programming purposes. Still yet, the tables may be loaded at runtime.

It should be noted that the operations 802–808 entail the same functionality carried out by the same dedicated hardware, regardless of the function being carried out. Such dedicated hardware outputs the sign, the exponent, and the sum for post-processing in operation 610 of FIG. 6.

Figure 9:
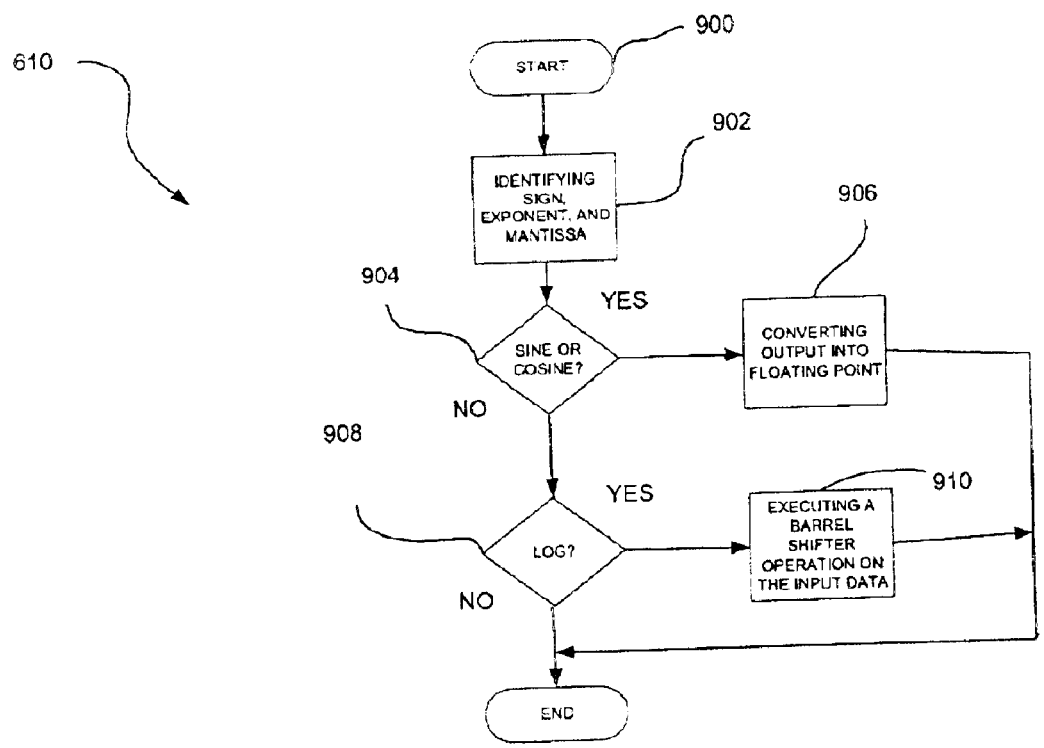
FIG. 9 illustrates a method for post-processing input data, in accordance with the process of FIG. 6.

FIG. 9 illustrates a method 900 for post-processing input data, in accordance with operation 610 of FIG. 6. While specific post-processing is set forth herein, it should be noted that the post-processing may include anything necessary to prepare the processed input data for output in accordance with operation 610, based on the specific function executed in operation 608.

Specifically, the sign, the exponent and the sum may be received from the method 800 of FIG. 8 for output as the sign, exponent and the mantissa, respectively. Note operation 902. It may further be determined if the presently executed function is either sine or cosine in decision 904. If so, the sign, exponent and the mantissa may be converted into a floating point format in operation 906. Further, in decision 908, it may be determined if the presently executed function is a logarithm. If so, a barrel shifter operation may be performed similar to operation 716 of FIG. 7.

The essence of post-processing 610 in the prefered embodiment is the conversion of fixed-point fractional data, as received from 608 into a floating-point format for storage in 612. (Additional responsibilities of 610 are the detection of special cases, e.g., sin(±inf)→NaN, log(x), x<0→−inf, sin(x), x≈0→x, etc.)

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for branching during programmable processing in a computer graphics pipeline, comprising:
   (a) receiving data;
   (b) performing programmable operations on the data in order to generate output, wherein the operations are programmable by a user utilizing instructions from a predetermined instruction set;
   (c) branching between the programmable operations in a programmable manner; and
   (d) storing the output in memory;
   wherein a swizzle operation is performed for component re-mapping by indicating a manner in which a plurality of source vector components are re-mapped as a plurality of input vector components;
   wherein the swizzle operation is carried out utilizing commands selected from the group consisting of: . xyzw which means source(x,y,z,w)→input(x,y,z,w); .zzxy which means source(x,y,z,w)→input(z,z,x,y); and .xxxx which means source(x,y,z,w)→input(x,x,x,x);
   wherein the operations include a call operation, a fraction operation a no operation, a move operation, a multiply operation, an addition operation, a multiply and addition operation, a reciprocal operation, a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

2. The method as recited in claim 1, wherein the programmable operations are branched to labels.

3. The method as recited in claim 2, wherein each index is calculated.

4. The method as recited in claim 2, wherein the labels are stored in a table.

5. The method as recited in claim 4, wherein the programmable operations are branched to indexes in the table.

6. The method as recited in claim 5, wherein each index is stored in an address register.

7. The method as recited in claim 1, and further comprising terminating the programmable operations after a predetermined number of operations have been performed.

8. The method as recited in claim 1, wherein the programmable operations are branched based on condition codes.

9. The method as recited in claim 8, wherein the condition codes are sourced as EQ(equal), NE(not equal), LT(less), GE(greater or equal), LE(less or equal), GT(greater), FL(false), and TR(true).

10. The method as recited in claim 8, wherein the condition codes are maskable.

11. The method as recited in claim 1, wherein the swizzle operation is carried out utilizing commands including .x which means .xxxx, .y which means .yyyy, .z which means .zzzz, and .w which means .wwww, thus providing a short-cut notation.

12. A method for branching during programmable processing in a computer graphics pipeline, comprising:
   (a) receiving data;
   (b) performing programmable operations on the data in order to generate output, wherein the operations are programmable by a user utilizing instructions from a predetermined instruction set;
   (c) branching between the programmable operations in a programmable manner; and
   (d) storing the output in memory;
   wherein a swizzle operation is performed for component re-mapping by indicating a manner in which a plurality of source vector components are re-mapped as a plurality of input vector components;
   wherein the programmable operations are branched based on condition codes;
   wherein the condition codes are swizzled for component re-mapping by indicating the manner in which the source vector components are re-mapped as the input vector components.

13. A computer program product for branching during programmable processing in a computer graphics pipeline, comprising:
   (a) computer code for receiving data;
   (b) computer code for performing programmable operations on the data in order to generate output, wherein the operations are programmable by a user utilizing instructions from a predetermined instruction set;
   (c) computer code for branching between the programmable operations in a programmable manner; and
   (d) computer code for storing the output in memory;
   wherein a swizzle operation is performed for component re-mapping by indicating a manner in which a plurality of source vector components are re-mapped as a plurality of input vector components;
   wherein the swizzle operation is carried out utilizing commands selected from the group consisting of: . xyzw which means source(x,y,z,w)→input(x,y,z,w); .zzxy which means source(x,y,z,w)→input(z,z,x,y); and .xxxx which means source(x,y,z,w)→input(x,x,x,x);
   wherein the operations include a call operation, a fraction operation, a no operation, a move operation, a multiply operation, an addition operation, a multiply and addition operation, a reciprocal operation, a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

14. A system for branching during programmable vertex processing, comprising:
 (a) a source buffer for storing data;
 (b) a functional module coupled to the source buffer for performing programmable operations on the data received therefrom in order to generate output, wherein the operations are programmable by a user utilizing instructions from a predetermined instruction set; and
 (c) a register coupled to the functional module for storing the output;
 (d) wherein functional module is capable of branching between the programmable operations;
 (e) wherein a swizzle operation is performed for component re-mapping by indicating a manner in which a plurality of source vector components are re-mapped as a plurality of input vector components;
  wherein the swizzle operation is carried out utilizing commands selected from the group consisting of: . xyzw which means source(x,y,z,w)→input(x,y,z,w); .zzxy which means source(x,y,z,w)→input(z,z,x,y); and .xxxx which means source(x,y,z,w)→input (x,x,x,x);
  wherein the operations include a call operation, a fraction operation, a no operation, a move operation, a multiply operation, an addition operation, a multiply and addition operation, a reciprocal operation a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

15. A method for programmable processing with condition codes in a computer graphics pipeline, comprising:
 (a) receiving data;
 (b) performing programmable operations on the data in order to generate output, wherein the operations are programmable by a user utilizing instructions from a predetermined instruction set including condition codes; and
 (c) storing the output in memory;
  wherein a swizzle operation is performed for component re-mapping by indicating a manner in which a plurality of source vector components are re-mapped as a plurality of input vector components;
  wherein the swizzle operation is carried out utilizing commands selected from the group consisting of: . xyzw which means source(x,y,z,w)→input(x,y,z,w); .zzxy which means source(x,y,z,w)→input(z,z,x,y); and .xxxx which means source(x,y,z,w)→input (x,x,x,x);
  wherein the operations include a call operation, a fraction operation, a no operation, a move operation, a multiply operation an addition operation, a multiply and addition operation, a reciprocal operation, a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

16. The method as recited in claim 15, wherein the condition codes are utilized to move between the programmable operations.

17. The method as recited in claim 15, wherein the condition codes are utilized to control write masks.

18. The method as recited in claim 17, wherein the write masks are controlled utilizing an AND operation.

19. A computer program product for programmable processing with condition codes in a computer graphics pipeline, comprising:
 (a) computer code for receiving data;
 (b) computer code for performing programmable operations on the data in order to generate output, wherein the operations are programmable by a user utilizing instructions from a predetermined instruction set including condition codes; and
 (c) computer code for storing the output in memory;
  wherein a swizzle operation is performed for component re-mapping by indicating a manner in which a plurality of source vector components are re-mapped as a plurality of input vector components;
  wherein the swizzle operation is carried out utilizing commands selected from the group consisting of: . xyzw which means source(x,y,z,w)→input(x,y,z,w); .zzxy which means source(x,y,z,w)→input(z,z,x,y); and .xxxx which means source(x,y,z,w)→input (x,x,x,x);
  wherein the operations include a call operation, a fraction operation, a no operation, a move operation, a multiply operation, an addition operation, a multiply and addition operation, a reciprocal operation, a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

20. A system for programmable vertex processing with condition codes, comprising:
 (a) a source buffer for storing data;
 (b) a functional module coupled to the source buffer for performing programmable operations on the data received therefrom in order to generate output, wherein the operations are programmable by a user utilizing instructions from a predetermined instruction set including condition codes; and
 (c) a register coupled to the functional module for storing the output;
 (d) wherein a swizzle operation is performed for component re-mapping by indicating a manner in which a plurality of source vector components are re-mapped as a plurality of input vector components;
  wherein the swizzle operation is carried out utilizing commands selected from the group consisting of: . xyzw which means source(x,y,z,w)→input(x,y,z,w); .zzxy which means source(x,y,z,w)→input(z,z,x,y); and .xxxx which means source(x,y,z,w)→input (x,x,x,x);
  wherein the operations include a call operation, a fraction operation, a no operation, a move operation, a multiply operation, an addition operation, a multiply and addition operation, a reciprocal operation, a reciprocal square root operation, a three component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

21. A method for programmable processing in a computer graphics pipeline utilizing a predetermined instruction set, comprising:

(a) receiving data from a source buffer;

(b) performing programmable operations on the data in order to generate output, wherein the operations are programmable by a user utilizing instructions from a predetermined instruction set; and (c) storing the output in a register;

wherein a swizzle operation is performed for component re-mapping by indicating a manner in which a plurality of source vector components are re-mapped as a plurality of input vector components:

wherein the swizzle operation is carried out utilizing commands selected from the group consisting of: . xyzw which means source(x,y,z,w)→input(x,y,z, w); .zzxy which means source(x,y,z,w)→input(z,z, x,y); and .xxxx which means source(x,y,z,w)→input (x,x,x,x);

(d) wherein the operations include a branch operation, a call operation, a return operation, a cosine operation, a sine operation, a floor operation, a fraction operation, a set-on-equal-to operation, a set false operation, a set-on-greater-than, a set-on-less-than-or-equal operation, a set-on-not-equal-to operation, a set true operation, a no operation, address register load, move, multiply, addition, multiply and addition, reciprocal, reciprocal square root, three component dot product, four component dot product, distance vector, minimum, maximum, set on less than, set on greater or equal than, exponential base two (2), logarithm base two (2), exponential, logarithm, and light coefficients.

22. A method for executing a function in a computer graphics pipeline, comprising:

(a) receiving input data in a computer graphics pipeline;

(b) directly performing a mathematical function on the input data in order to generate output data, wherein the mathematical function is directly performed in the computer graphics pipeline; and (c) storing the output data in memory on the computer graphics pipeline;

wherein a swizzle operation is performed for component re-mapping by indicating a manner in which a plurality of source vector components are re-mapped as a plurality of input vector components;

wherein the swizzle operation is carried out utilizing commands selected from the group consisting of: . xyzw which means source(x,y,z,w)→input(x,y,z, w); .zzxy which means source(x,y,z,w)→input(z,z, x,y); and .xxxx which means source(x,y,z,w)→input (x,x,x,x);

wherein a plurality of programmable operations are performed including a call operation, a fraction operation, a no operation, a move operation, a multiply operation, an addition operation, a multiply and addition operation a reciprocal operation, a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

23. The method as recited in claim 22, wherein the mathematical function is selected from the group consisting of sine, cosine, exponent base two (2), and logarithm base two (2).

24. The method as recited in claim 22, wherein the mathematical function is selected from the group consisting of sine, cosine, tangent, arctangent, exponent, logarithm, antilogarithm, hyperbolic sine, hyperbolic cosine, hyperbolic tangent, and hyperbolic arctangent.

25. The method as recited in claim 22, wherein the input data is in a floating-point format.

26. The method as recited in claim 22, wherein the mathematical function is performed utilizing a Taylor Series.

27. The method as recited in claim 22, wherein the mathematical function is performed utilizing a cordic algorithm.

28. The method as recited in claim 22, and further comprising converting the input data from a first coordinate system to a second coordinate system.

29. The method as recited in claim 22, wherein the mathematical function is carried out in one cycle in the computer graphics pipeline.

30. A computer program product for executing a function in a computer graphics pipeline, comprising:

(a) computer code for receiving input data in a computer graphics pipeline;

(b) computer code for directly performing a mathematical function on the input data in order to generate output data, wherein the mathematical function is directly performed in the computer graphics pipeline; and (c) computer code for storing the output data in memory on the computer graphics pipeline;

wherein a swizzle operation is performed for component re-mapping by indicating a manner in which a plurality of source vector components are re-mapped as a plurality of input vector components;

wherein the swizzle operation is carried out utilizing commands selected from the group consisting of: . xyzw which means source(x,y,z,w)→input (x,y,z,); .zzxy which means source(x,y,z,w)→input (z,z,x,y); and .xxxx which means source (x,y,z,w)→input(x,x,x,x);

wherein a plurality of programmable operations are performed including a call operation, a fraction operation, a no operation, a move operation, a multiply operation, an addition operation, a multiply and addition operation, a reciprocal operation, a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

31. A system for executing a function in a computer graphics pipeline, comprising:

(a) a computer graphics pipeline for receiving input data, directly performing a mathematical function on the input data in order to generate output data, and storing the output data in memory;

(b) wherein the mathematical function is directly performed in the computer graphics pipeline;

wherein a swizzle operation is performed for component re-mapping by indicating a manner in which a plurality of source vector components are re-mapped as a plurality of input vector components;

wherein the swizzle operation is carried out utilizing commands selected from the group consisting of: .xyzw which means source(x,y,z,w)→input(x,y,z,w); .zzxy which means source(x,y,z,w)→input(z,z,x,y); and .xxxx which means source(x,y,z,w)→input(x,x,x,x);

wherein a plurality of programmable operations are performed including a call operation, a fraction operation, a no operation, a move operation, a multiply operation, an addition operation, a multiply and addition operation, a reciprocal operation, a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

32. A system for executing a function in a computer graphics pipeline, comprising:

(a) means for receiving input data in a computer graphics pipeline;

(b) means for directly performing a mathematical function on the input data in order to generate output data, wherein the mathematical function is directly performed in the computer graphics pipeline; and (c) means for storing the output data in memory on the computer graphics pipeline;

wherein a swizzle operation is performed for component re-mapping by indicating a manner in which a plurality of source vector components are re-mapped as a plurality of input vector components:

wherein the swizzle operation is carried out utilizing commands selected from the group consisting of: .xyzw which means source(x,y,z,w)→input(x,y,z,w); .zzxy which means source(x,y,z,w)→input(z,z,x,y); and .xxxx which means source(x,y,z,w)→input(x,x,x,x);

wherein a plurality of programmable operations are performed including a call operation, a fraction operation a no operation, a move operation, a multiply operation, an addition operation, a multiply and addition operation, a reciprocal operation, a reciprocal square root operation, a three component dot product operation, a four component dot product operation, a distance vector operation, a minimum operation, a maximum operation, a set on less than operation, a set on greater or equal than operation, an exponential base two (2) operation, a logarithm base two (2) operation, a light coefficients operation, and at least one of a sine and a cosine operation.

33. A method for executing a function, comprising:

(a) receiving input data;

(b) identifying the function to be executed on the input data;

(c) pre-processing the input data based on the function to be executed on the input data;

(d) processing the input data utilizing a plurality of operations independent of the function to be executed on the input data;

(e) post-processing the input data to generate output data; and (f) storing the output data in memory;

wherein the pre-processing includes adding a one (1) to the phase of the input data if the function to be executed on the input data is cosine.

34. The method as recited in claim 33, wherein the pre-processing includes multiplying the input data by $(1/(2\pi)+1)$ if the function to be executed on the input data is at least one of sine and cosine.

35. The method as recited in claim 33, wherein the pre-processing includes performing a conditional 1's complement operation on the input data if the function to be executed on the input data is at least one of sine or cosine.

36. The method as recited in claim 33, wherein the pre-processing includes performing a barrel shift operation on the input data if the function to be executed on the input data is the exponent operation.

37. The method as recited in claim 33, wherein the processing includes extracting a set of most significant bits and a set of least significant bits from a mantissa associated with the input data.

38. The method as recited in claim 33, wherein the processing further includes conditionally adding a one (1) to the most significant bits.

39. The method as recited in claim 33, wherein the processing includes calculating a Taylor Series.

40. The method as recited in claim 39, wherein the processing includes, looking up information in a plurality of tables.

41. The method as recited in claim 40, wherein the tables are utilized based on the function to be executed on the input data.

42. The method as recited in claim 41, wherein the tables are hard-coded.

43. The method as recited in claim 41, wherein the tables are programmable.

44. The method as recited in claim 41, wherein the tables are loaded at runtime.

45. The method as recited in claim 40, wherein the information includes a plurality of derivatives.

46. The method as recited in claim 45, wherein the derivatives are summed.

47. The method as recited in claim 33, wherein (b)–(f) are carried out in one cycle.

48. The method as recited in claim 33, wherein the function includes at least one of sin(x) and cos(x), where x is in at least one of degrees and radians.

49. A computer program product for executing a function, comprising:

(a) computer code for receiving input data;

(b) computer code for identifying the function to be executed on the input data;

(c) computer code for pre-processing the input data based on the function to be executed on the input data;

(d) computer code for processing the input data utilizing a plurality of operations independent of the function to be executed on the input data;

(e) computer code for post-processing the input data to generate output data; and (f) computer code for storing the output data in memory; wherein the pre-processing includes multiplying the input data by $(1/(2\pi)+1)$ if the function to be executed on the input data is at least one of sine and cosine.

50. A system for executing a function, comprising:

(a) logic for receiving input data;

(b) logic for identifying the function to be executed on the input data;

(c) logic for pre-processing the input data based on the function to be executed on the input data;

(d) logic for processing the input data utilizing a plurality of operations independent of the function to be executed on the input data;

(e) logic for post-processing the input data to generate output data; and (f) logic for storing the output data in memory; wherein the pre-processing includes multiplying the input data by $(1/(2\pi)+1)$ if the function to be executed on the input data is at least one of sine and cosine.

51. A method for executing a function in a computer graphics pipeline, comprising:

(a) receiving input data in a computer graphics pipeline;

(b) identifying a sign, an exponent, and a mantissa associated with the input data utilizing the computer graphics pipeline;

(c) normalizing the input data utilizing the computer graphics pipeline;

(d) if the function includes an exponent function, executing a barrel shift operation on the input data utilizing the computer graphics pipeline;

(e) if the function includes a cosine function, adding a one (1) to the phase of the input data utilizing the computer graphics pipeline;

(f) if the function includes at least one of a sine function and a cosine function, multiplying the input data by $(1/(2\pi)+1)$ and performing a conditional 1's complement operation on the input data utilizing the computer graphics pipeline;

(g) extracting a set of most significant bits and a set of least significant bits from the mantissa associated with the input data utilizing the computer graphics pipeline;

(h) adding a one (1) to the most significant bits utilizing the computer graphics pipeline;

(i) looking up a plurality of derivatives based on the most significant bits utilizing the computer graphics pipeline;

(j) calculating a Taylor Series with the derivatives and the least significant bits utilizing the computer graphics pipeline;

(k) post-processing the input data to generate output data utilizing the computer graphics pipeline;

(l) storing the output data in memory on the computer graphics pipeline.

* * * * *

UNITED STATES PATENT AND TRADEMARK OFFICE
CERTIFICATE OF CORRECTION

| | | |
|---|---|---|
| PATENT NO. | : 6,844,880 B1 | Page 1 of 1 |
| APPLICATION NO. | : 09/960630 | |
| DATED | : January 18, 2005 | |
| INVENTOR(S) | : Lindholm et al. | |

It is certified that error appears in the above-identified patent and that said Letters Patent is hereby corrected as shown below:

Col. 33, line 44, please replace "fraction operation" with --fraction operation,--;
Col. 35, line 26, please replace "reciprocal operation" with --reciprocal operation,--;
Col. 37, line 16, please replace "components:" with --components;--;
Col. 37, line 23, please replace "(d) wherein" with --wherein--;
Col. 37, line 59, please replace "addition operation" with --addition operation,--;
Col. 39, line 33, please replace "components:" with --components;--;
Col. 39, line 42, please replace "operation a" with --operation, a--.

Signed and Sealed this
Twelfth Day of July, 2011

David J. Kappos
*Director of the United States Patent and Trademark Office*